(12) United States Patent
Yao et al.

(10) Patent No.: US 12,083,574 B2
(45) Date of Patent: Sep. 10, 2024

(54) SERRATED SURFACES FOR ANTI-ICING APPLICATIONS

(71) Applicant: Northwestern University, Evanston, IL (US)

(72) Inventors: Yuehan Yao, Evanston, IL (US); Kyoo-Chul Park, Wilmette, IL (US)

(73) Assignee: Northwestern University, Evanston, IL (US)

( * ) Notice: Subject to any disclaimer, the term of this patent is extended or adjusted under 35 U.S.C. 154(b) by 852 days.

(21) Appl. No.: 17/265,775

(22) PCT Filed: Aug. 8, 2019

(86) PCT No.: PCT/US2019/045710
§ 371 (c)(1),
(2) Date: Feb. 3, 2021

(87) PCT Pub. No.: WO2020/033690
PCT Pub. Date: Feb. 13, 2020

(65) Prior Publication Data
US 2022/0001432 A1 Jan. 6, 2022

Related U.S. Application Data

(60) Provisional application No. 62/716,014, filed on Aug. 8, 2018.

(51) Int. Cl.
*B21D 5/16* (2006.01)
*B29C 43/02* (2006.01)
(Continued)

(52) U.S. Cl.
CPC .............. *B21D 5/16* (2013.01); *B29C 43/021* (2013.01); *B29C 43/32* (2013.01); *B29C 43/36* (2013.01);
(Continued)

(58) Field of Classification Search
None
See application file for complete search history.

(56) References Cited

U.S. PATENT DOCUMENTS

| | | | |
|---|---|---|---|
| 2009/0057947 A1* | 3/2009 | Nemchick | B29C 33/50 264/258 |
| 2013/0227972 A1* | 9/2013 | Hatton | C09D 5/1681 428/167 |

(Continued)

FOREIGN PATENT DOCUMENTS

| | | | |
|---|---|---|---|
| JP | 2017021037 A | * | 1/2017 |
| WO | WO 2017/187073 A1 | | 11/2017 |

OTHER PUBLICATIONS

Jonathan B. Boreyko et al., "Delayed frost growth on jumping-drop superhydrophobic surfaces," ACS Nano, 2013, vol. 7, No. 2, pp. 1618-1627.

(Continued)

*Primary Examiner* — Thomas C Lee
*Assistant Examiner* — Anzuman Sharmin
(74) *Attorney, Agent, or Firm* — Bell & Manning, LLC

(57) ABSTRACT

A method of forming an ice resistant surface includes determining, based at least in part on a desired pattern of frost formation, a vertex angle for a ridge that is to be formed on a substrate. The method also includes determining, based at least in part on the desired pattern of frost formation, a vertex height for the ridge that is to be formed on the substrate. The method further includes forming a plurality of ridges on the substrate, where each ridge in the plurality of ridges has the vertex angle and the vertex height.

20 Claims, 25 Drawing Sheets

(51) Int. Cl.
*B29C 43/32* (2006.01)
*B29C 43/36* (2006.01)
*B29C 43/58* (2006.01)

(52) U.S. Cl.
CPC ........ *B29C 43/58* (2013.01); *B29C 2043/023* (2013.01); *G05B 2219/45137* (2013.01)

(56) References Cited

U.S. PATENT DOCUMENTS

| | | | |
|---|---|---|---|
| 2014/0017456 A1* | 1/2014 | Xiao | B81C 1/00206 427/256 |
| 2014/0272301 A1 | 9/2014 | Gross et al. | |
| 2014/0287150 A1* | 9/2014 | Miljkovic | C23C 16/4414 427/458 |
| 2014/0332933 A1* | 11/2014 | Li | H01L 33/16 257/623 |
| 2016/0333458 A1 | 11/2016 | Haupt et al. | |
| 2017/0282416 A1 | 10/2017 | Kim et al. | |
| 2018/0180364 A1* | 6/2018 | Dhiman | B64D 15/06 |
| 2018/0194619 A1* | 7/2018 | Greer | B05D 1/18 |
| 2018/0215927 A1* | 8/2018 | Rykaczewski | B05D 1/18 |

OTHER PUBLICATIONS

Jie Liu et al., "Distinct ic patterns on solid surfaces with various wettabilities," Proc. Natl. Acad. Sci. U.S.A. 2017, vol. 114, pp. 11285-11290.

Yao, Y., Aizenberg, J., & Park, K.-C., "Dropwise condensation on hydrophobic bumps and dimples," Applied Physics Letters, vol. 112, 151605, (2018).

Park, K.-C., Kim, P., Grinthal, A., He, N., Fox, D., Weaver, J. C. & Aizenberg, J., "Condensation on slippery asymmetric bumps," Nature, vol. 531, pp. 78-82, (2016).

Shi, W., Anderson, M. J., Tulkoff, J. B., Kennedy, B. S. & Boreyko, J. B., "Fog harvesting with harps," ACS Applied Materials & Interfaces, vol. 10. pp. 11979-11986, (2018).

Dai, X., Sun, N., Nielsen, S. O., Stogin, B. B., Wang, J., Yang, S., & Wong, T. S., "Hydrophilic directional slippery rough surfaces for water harvesting," Science Advances, vol. 4, eaaq0919, pp. 1-10, (2018).

Damak, M. & Varanasi, K. K., "Electrostatically driven fog collection using space charge injection," Science Advances, vol. 4, eaao5323 (2018).

Moyuan Cao et al., "Hydrophobic/Hydrophilic cooperative Janus system for enhancement of fog collection," Small, 2015, vol. 11, pp. 4379-4384.

Hai Zhu et al., "High-efficiency water collection on biomimetic material with superwettable patterns," Chem. Commun. 2016, vol. 52, pp. 12415-12417.

The International Search Report and the Written Opinion issued on Nov. 1, 2019 for International Patent Application No. PCT/US19/45710, pp. 1-7.

H. G. Andrews et al., "Three-dimensional hierarchical structures for fog harvesting," *Langmuir* 2011, vol. 27, No. 7, pp. 3798-3802.

Marie-Gabrielle Medici et al., "Edge effect on water droplet condensation," *Phys. Rev. E* 2014, vol. 90, 062403.

* cited by examiner

VALLEY

C1

C2

C3

100°

90°

60°

40°, 5 HOURS

40°

180°

US 12,083,574 B2

SERRATED SURFACES FOR ANTI-ICING APPLICATIONS

CROSS-REFERENCE TO RELATED APPLICATION

The present application is a National Stage of International Application No. PCT/US19/45710 filed on Aug. 8, 2019, which claims the priority benefit of U.S. Provisional Patent App. No. 62/716,014 filed on Aug. 8, 2018, the entire disclosures of which are incorporated by reference herein.

BACKGROUND

Ice formation can result from the freezing of subcooled liquid water on the surfaces or the frosting of moisture in the ambient air. Frosting is an interfacial process that can be ubiquitously found in nature when the surface temperature drops down to a certain point. Ice accretion on surfaces can cause serious energy waste and safety threats in many practical scenarios. For example, air drag increases when ice accumulates on aircraft, wind turbines, vehicles, etc. because the ice buildup disturbs the smooth airflow around the surface(s) on which ice is present. Heat exchange efficiency is also decreased by frosting due to the low thermal conductivity of ice cover.

SUMMARY

An illustrative method of forming an ice resistant surface includes determining, based at least in part on a desired pattern of frost formation, a vertex angle for a ridge that is to be formed on a substrate. The method also includes determining, based at least in part on the desired pattern of frost formation, a vertex height for the ridge that is to be formed on the substrate. The method further includes forming a plurality of ridges on the substrate, where each ridge in the plurality of ridges has the vertex angle and the vertex height.

An illustrative system for forming an ice resistant surface includes a memory configured to store information regarding relationships between vertex angles and frost formation patterns. The system also includes a processor operatively coupled to the memory and configured to determine, based at least in part on a desired pattern of frost formation, a vertex angle for a ridge that is to be formed on a substrate. The processor is also configured to determine, based at least in part on the desired pattern of frost formation, a vertex height for the ridge that is to be formed on the substrate. The system further includes a mold that has a plurality of ridges and that is configured to form the plurality of ridges on the substrate, where each ridge in the plurality of ridges has the vertex angle and the vertex height.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1A:
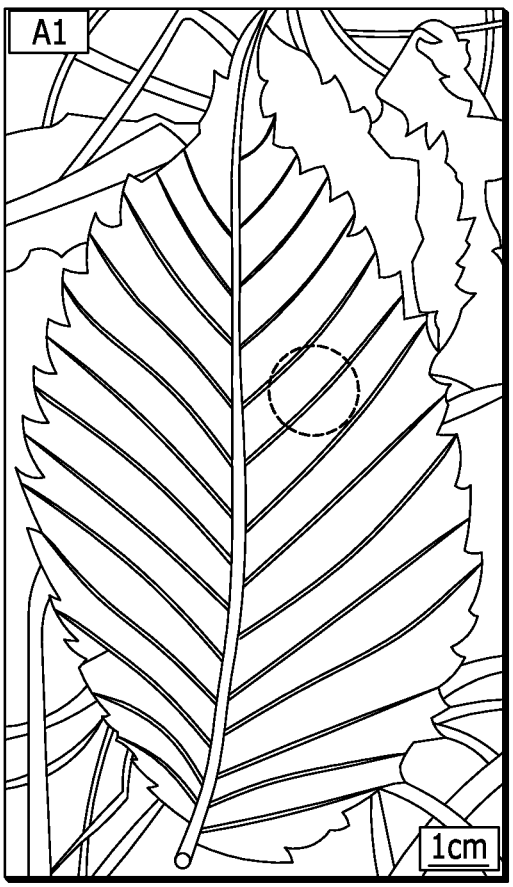
FIG. 1A depicts a frost pattern on a fresh elm leaf in a natural environment of frosting in accordance with an illustrative embodiment.

A lot of research efforts have been devoted to the development of anti-icing and de-icing strategies. Supehydrophobic surfaces, which incorporate an extremely low surface energy coating and surface roughness in micro/nanometers, are effective in delaying ice formation because of the low number of nucleation sites and minimized water-solid heat transfer by the air pockets in the space between asperities underneath water. However, ice formation is inevitable on such surfaces when the water vapor in the humid air can easily diffuse into the space between the small asperities. This so-called Wenzel ice which eventually forms the solid ice interface shows a significantly high removal strength due to interlocking between the ice and the surface texture. To minimize the ice removal strength, an additional layer of a fluid that is not miscible with water and has a low melting point (e.g., <0° C.) is often introduced between the ice and solid surface. Such slippery liquid-infused porous surfaces (SLIPS), which use a low surface tension oil as the fluid and show molecular level smoothness, are not only able to delay freezing, but also to reduce ice adhesion strength by up to two orders of magnitude compared to a non-coated surface. On the other hand, the frozen ice can also be self-lubricated by a thin layer of water between the ice and surface if the surface is coated by a hygroscopic material such as polyethylene oxide brushes. Based on these discoveries, other surfaces including ferrofluids and oil-infused polymeric materials have also been investigated. However, despite these research efforts, a robust surface that shows long-term resistance to frosting has not been developed.

The scientific challenges in developing icephobic surfaces have not been fully addressed in part because of degradation such as mechanical wearing. Inspired by the suppressed frost formation on concave regions of natural leaves, the inventors have explored the frosting process on hydrophobic and hydrophilic surfaces with various serrated structures. The inventors have found that dropwise condensation, the first stage of frosting, is enhanced on the peaks and suppressed in the valleys when a wavy (or ridged) surface is exposed to humid air, causing frosting to initiate from the peak. The condensed droplets in the valley are then evaporated due to the difference of equilibrium vapor pressure, resulting in a non-frost band on both hydrophobic and superhydrophilic surfaces. As discussed in more detail below, in-plane and out-of-plane frost growth have been systematically studied by employing various levels of ambient humidity, surface wettability, and surface geometry defined as the vertex angle. Numerical simulations show the critical role of diffusion of water vapor in the formation of the discontinuous frost pattern, and heat transfer within the accreted ice in the out-of-plane frost accumulation.

Previous studies by the inventors have shown that the millimetric surface topography plays an important role in dropwise condensation, in that droplet growth is enhanced on bumps while suppressed in dimples. The similarity between the convex and concave surface topography formed on natural leaves and the previously studied bumps and dimples inspired the inventors to investigate the impact of millimetric surface topography on frosting. As discussed in more detail below, the inventors examined the accumulation of frost on non-flat hydrophobic aluminum surfaces with various millimetric serrated features that resemble the convex leaf veins.

Figure 1B:
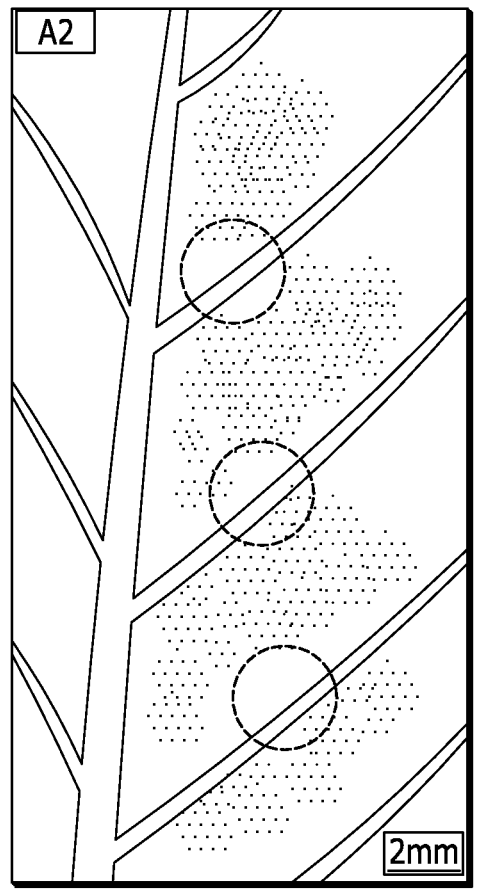
FIG. 1B is a closeup of the frost pattern on the fresh elm leaf in accordance with an illustrative embodiment.
Figure 1C:
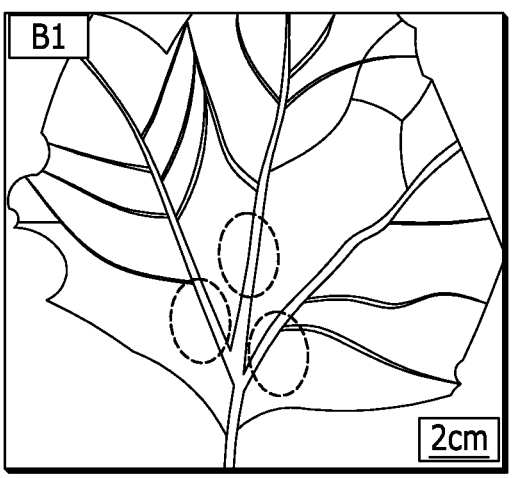
FIG. 1C depicts a frost pattern on a maple leaf that has been placed into a freezer in accordance with an illustrative embodiment.
Figure 1D:
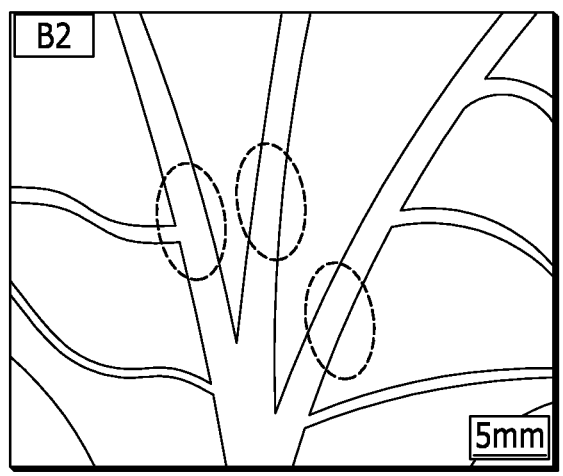
FIG. 1D is a close up view of the maple leaf of FIG. 1C in accordance with an illustrative embodiment.

FIG. 1A depicts a frost pattern on a fresh elm leaf in a natural environment of frosting in accordance with an illustrative embodiment. FIG. 1B is a closeup of the frost pattern on the fresh elm leaf in accordance with an illustrative embodiment. As depicted, the number density of ice crystals is noticeably high on the veins of the leaf which are topographically convex, while the flat region between the veins is almost free of frost. To more fully investigate this observation, experiments were run that simulated the frosting condition by placing a maple leaf inside a freezer and increasing the humidity level. FIG. 1C depicts a frost pattern on a maple leaf that has been placed into a freezer in accordance with an illustrative embodiment. FIG. 1D is a close up view of the maple leaf of FIG. 1C in accordance with an illustrative embodiment. The maple leaf images were taken after 3 minutes of artificial frosting. As shown, the maple leaf placed into the freezer has a similar frost pattern to the naturally frozen elm leaf of FIGS. 1A and 1B.

Figure 2A:
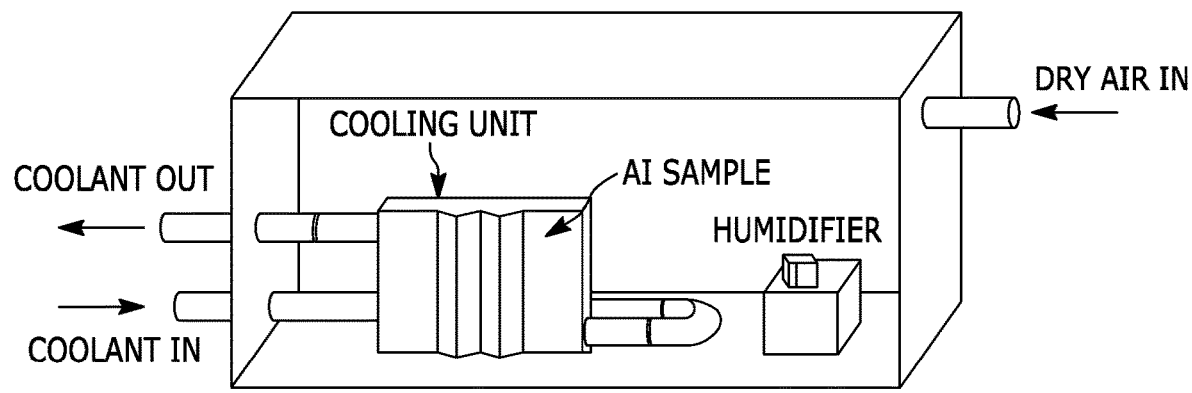
FIG. 2A depicts an experimental setup for controlled frost growth in accordance with an illustrative embodiment.

FIG. 2A depicts an experimental setup for controlled frost growth in accordance with an illustrative embodiment. The experimental setup includes a cooling unit and accompanying tubing to allow for the flow of coolant in/out of the system. In one embodiment, the cooling unit can maintain a temperature of $\sim -12°$ Celsius (C). Alternatively, different temperatures may be used. The experimental setup also includes an input for (dry) air and a humidifier that can be used to control the humidity of the system and create a supersaturated environment. The setup can also include a humidity sensor connected to an external humidity controller such that a user can determine the actual humidity within the system and make adjustments to the humidity via the humidifier. In the embodiment depicted in FIG. 2A, frost is grown on an aluminum (Al) sample.

Components of the experimental setup can be housed in a customized chamber (e.g., 107 cm×38 cm×300 mm, L×W×H). The air velocity inside the chamber can be maintained at a low level (e.g., <0.1 m/s) to minimize the effects of convection on the sample. In some embodiments, samples can be taped onto a 3D printed cooling unit, with one side having the same macroscopic pattern as the aluminum sample. In an illustrative embodiment, a small wall thickness of 0.5 mm was used to minimize the temperature difference across the surface. The cooling units were connected to an external circulating liquid chiller to keep the surface temperature of the samples at $-12\pm0.5°$ C., which is measured by a digital thermometer. During the experiments, ambient temperature was $23.5\pm0.5°$ C. The samples were vertically positioned, and a plastic cover was used to isolate the surfaces from the ambient air before the temperature of the sample surface was stabilized, at which t=0 was defined. The frosting processes were recorded using a camera with a macro lens and a microscope objective.

Figure 2B:
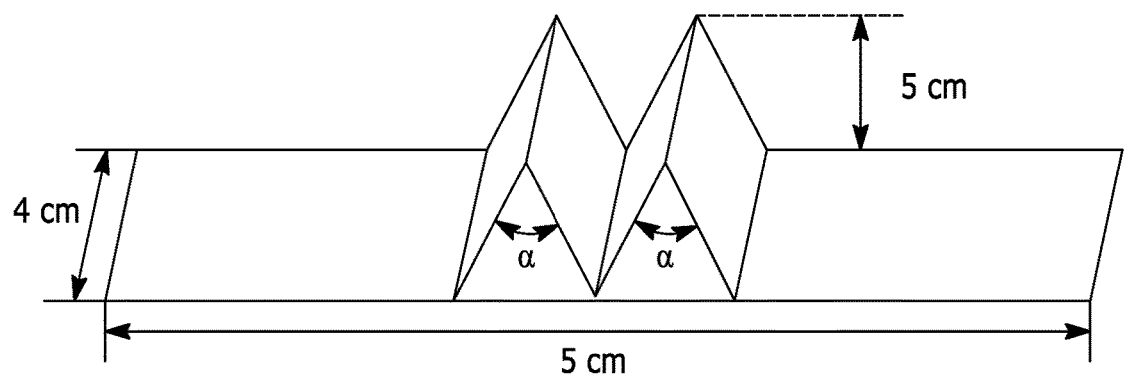
FIG. 2B depicts an aluminum sample in accordance with an illustrative embodiment.

FIG. 2B depicts an aluminum sample in accordance with an illustrative embodiment. In one embodiment, the aluminum sample can be formed using a pair of 3D-printed molds and a flat aluminum sheet. The flat aluminum sheet (e.g., 0.127 mm thick) is pressed between the molds (which include the ridges) to form the sample. Alternatively, a different fabrication technique may be used. As shown, the aluminum sample is 4 by 5 centimeters (cm) and includes 5 millimeter (mm) high ridges (or waves). The ridges are also defined by a vertex angle $\alpha$, which can be 40°, 60°, 90°, 100°, etc. A different size/configuration of aluminum sample can be used in alternative implementations. In alternative embodiments, the experimental setup can also be used to grow frost on any other surface, such as the maple leaf of FIGS. 1C and 1D.

In an illustrative embodiment, the aluminum sample can be fabricated to include hydrophobic and/or superhydrophilic serrated surfaces. The macroscopically-patterned aluminum surfaces are intrinsically hydrophilic with a static contact angle $\theta^*=81°$. The superhydrophilic samples were treated by oxygen plasma for 1 min to remove the organic contaminants and activate the aluminum surfaces. To obtain hydrophobicity, the superhydrophilic samples were immersed in a 1% (by weight) solution of fluoroaliphatic phosphate ester fluorosurfactant (FS-100, Pilot Chemical) in ethanol at 70° C. for 30 minutes. The static contact angles on the superhydrophilic and hydrophobic surfaces are measured to be 0° and 123°, respectively. In alternative embodiments, a different procedure may be used to form the hydrophobic surfaces and/or different static contact angles may be used.

Figures 3A, 3B:
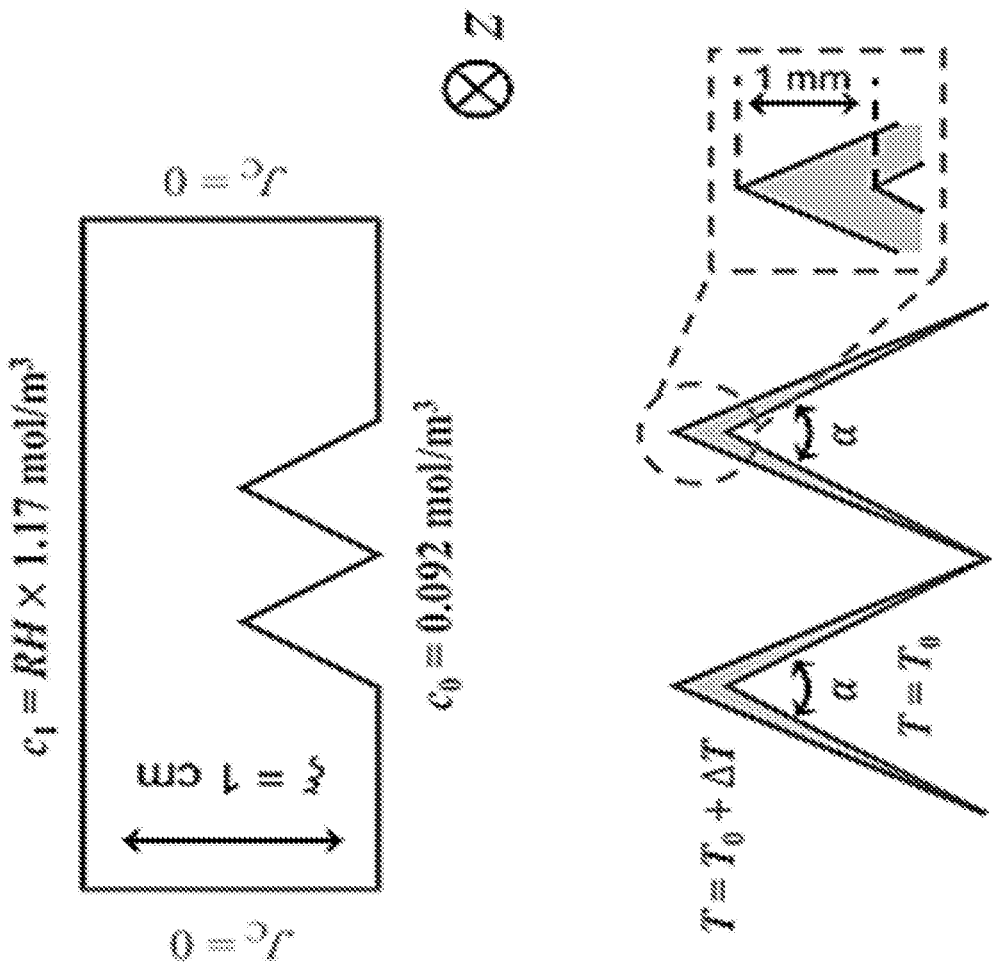
FIG. 3A depicts the boundary conditions for simulating diffusion of water into boundary air in accordance with an illustrative embodiment.
FIG. 3B depicts boundary conditions for simulating heat transfer in the frost cover in accordance with an illustrative embodiment.

In experiments described herein, models for steady state transport of dilute species were used to numerically calculate the magnitude of diffusion flux of water vapor. FIG. 3A depicts the boundary conditions for simulating diffusion of water into boundary air in accordance with an illustrative embodiment. In FIG. 3A, the bottom surface is assumed to be of the same dimensions as the sample used for frosting experiments (as shown in FIG. 2B) except that the z-length is assumed to be infinite so that 2-D coordinates can be used for this modeling. Other parameters include: $c_0=0.092$ mol/m$^3$ is the saturated vapor concentration of supercooled water at the surface temperature of $T_{surf}=-12°$ C., C1 is the concentration of water vapor in the ambient, RH is the relative humidity in the ambient, 1.17 mol/m$^3$ is the saturated vapor concentration of water at $T_{ambient}=23.5°$ C., and c=1 cm is the thickness of boundary layer in which diffusion dominates the mass transport. Steady state is assumed so that the Laplace equation is satisfied: $\Delta c = \nabla^2 c = 0$. The calculated diffusion flux $J_{Cc}=D|\nabla c|$ is normalized by $J_0=D(c_1-c_0)/\xi$, where D=0.19 cm$^2$/s is the mass diffusivity of water vapor in air at 23.5° C. and atmospheric pressure, and $|\nabla c|$ is the magnitude of concentration gradient of water vapor evaluated at any given spatial location.

Additionally, models for steady state heat transfer in solids were used to numerically calculate the magnitude of heat flux by conduction within the frost cover. FIG. 3B depicts boundary conditions for simulating heat transfer in the frost cover in accordance with an illustrative embodiment. In FIG. 3B, the bottom surface is assumed to be the same dimensions as the samples used for frosting experiments (as shown in FIG. 2B), except that the z-length is assumed to be infinite so that 2-D coordinates can be used for modeling. Other parameters include: $T_0=-12°$ C. is the surface temperature, and $T_1=T_0+\Delta T$ is the surface temperature of the frost cover. The thickness of the frost cover is assumed to linearly increase from 0 at the valley to 1 mm at the peak, which has similar profile as observed in out-of-plane growth experiments that are described herein with reference to FIG. 8. Steady state is assumed so that the Laplace equation is satisfied: $\Delta T=\nabla^2 T=0$. The calculated heat flux $q_c=k|\nabla T|$ is normalized by $q_0=k(T_1-T_0)/d_{1/2}$, where k=2.32 W/m K is the thermal conductivity of ice at $-12°$ C., $|\nabla T|$ is the magnitude of temperature gradient evaluated at any given spatial location, and $d_{1/2}=0.5$ mm is half of the maximum thickness of the frost cover at the peak. The choice of $T_1$ (or $\Delta T$) and k is arbitrary because of the normalization.

Figure 4A:
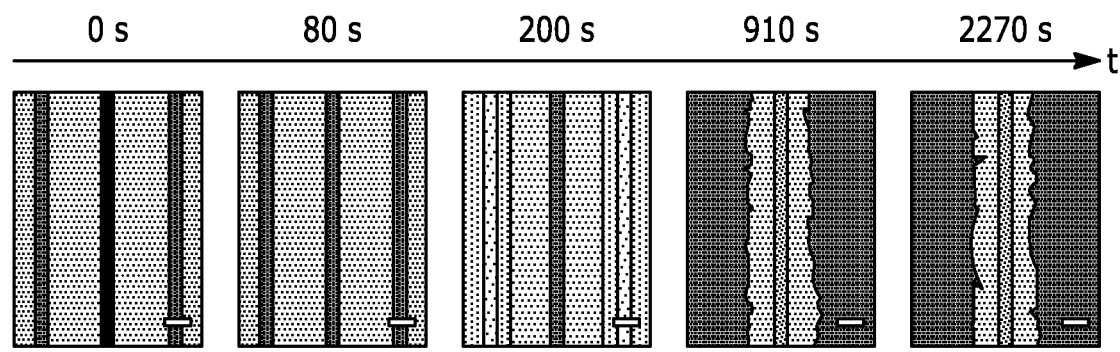
FIG. 4A depicts time-lapse images of the frosting process on a hydrophobic serrated surface with a vertex angle of $\alpha=60°$ and at an ambient humidity of $RH=25\pm2\%$ in accordance with an illustrative embodiment.

FIG. 4A depicts time-lapse images of the frosting process on a hydrophobic serrated surface with a vertex angle of $\alpha=60°$ and at an ambient humidity of RH=25±2% in accordance with an illustrative embodiment. In FIG. 4A, four stages can be clearly identified in the frosting process: I) condensation, in which haze features grow on the reflective surface (t=80 sec), II) fast propagation, in which frost initiates from the peaks and then quickly propagates towards the valley (t=200 sec), III) evaporation, in which frost propagation slows down and haze in the valley diminishes (t=910 sec), and IV) deposition, in which ice crystals grow slowly into a dendrite shape (t=2270 sec and onward). With repeated experiments, two traits can be identified which are distinct from the frosting process on a flat surface. At the onset stage (t<80 sec), frosting always initiates from the peaks rather than from the valleys or anywhere in between. At the end stage (t>2270 seconds), frost preferentially covers the peaks, while a non-frost region which spans about half of the total surface area between the two peaks exists at the valley. This discontinuous coverage of frost resembles the frost pattern found on the natural leaves, where frost preferentially covers the leaf veins while the flat regions in between show less frost coverage. Since the rate of frost invasion into the valley becomes significantly slower than that of the frost propagation from the peaks, this non-frosted band in the valley can be considered to resist against frost formation for a long period of time.

Figure 4B:
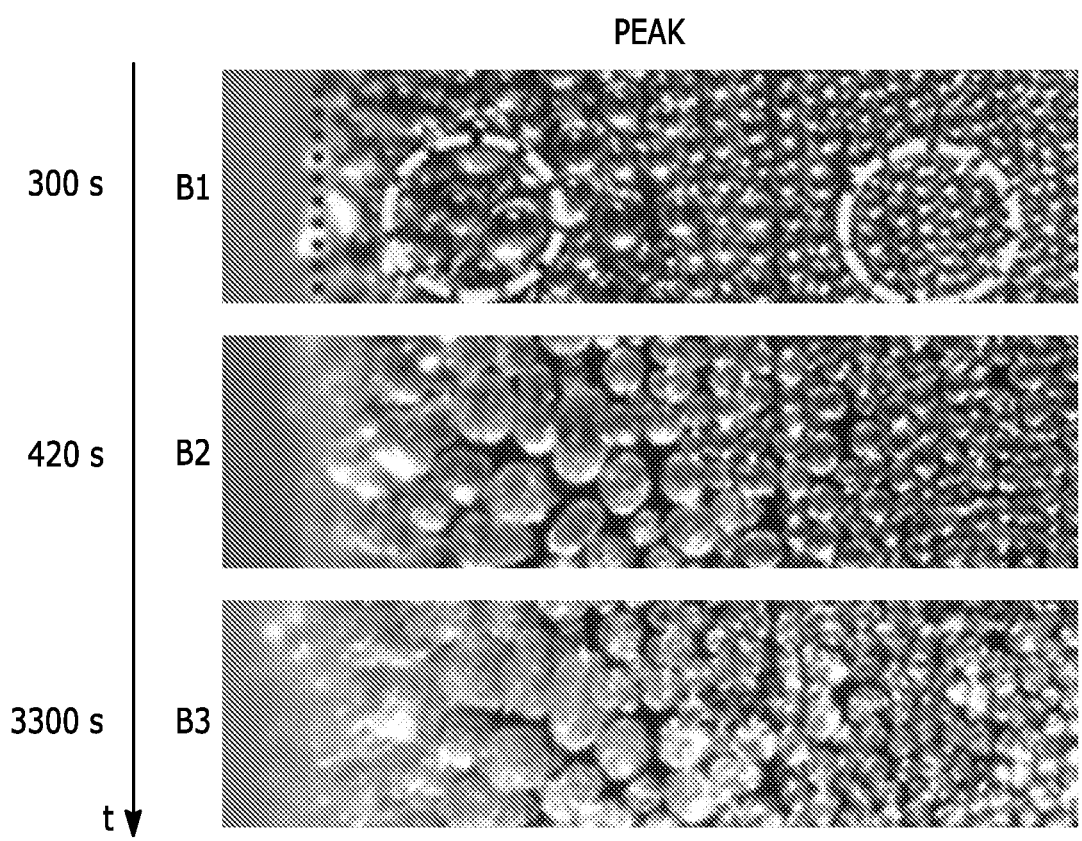
FIG. 4B depicts microscopic images of the frosting process at a peak of the sample in accordance with an illustrative embodiment.
Figure 4C:
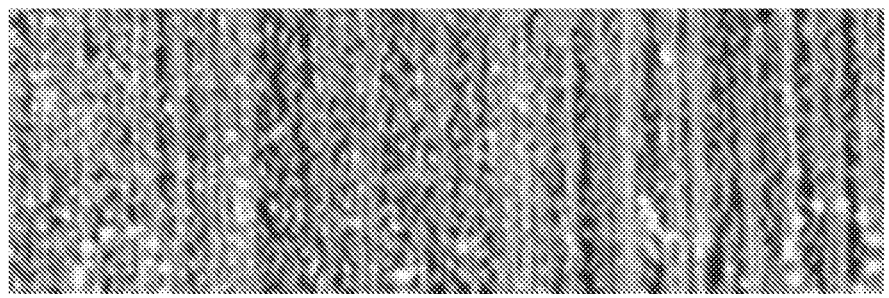
FIG. 4C depicts microscopic images of the frosting process at a valley of the sample in accordance with an illustrative embodiment.
Figure 4C:
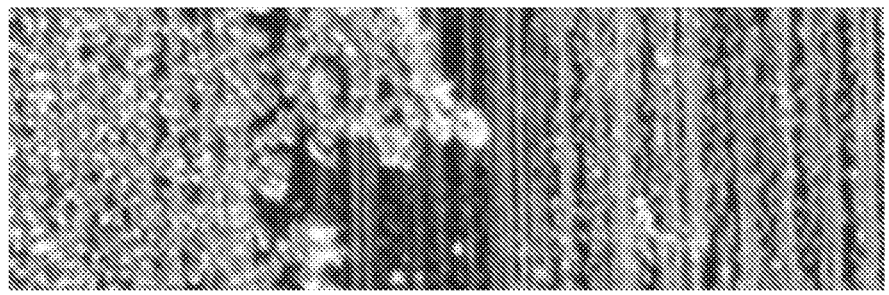
Figure 4C:
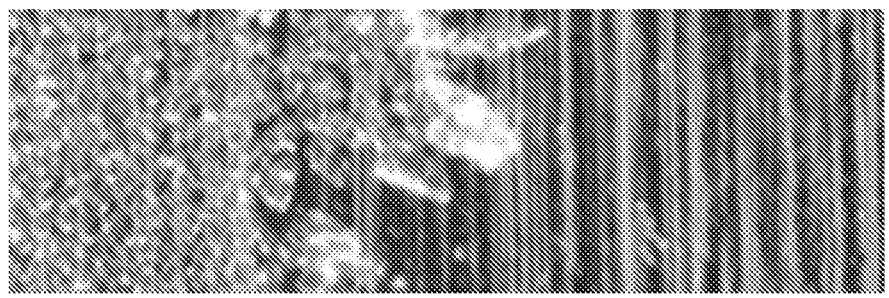

To better understand the mechanism of the discontinuity of frost pattern, a microscope objective lens was used to visualize the frosting process at the peak and valley, as shown in FIGS. 4B and 4C. Specifically, FIG. 4B depicts microscopic images of the frosting process at a peak of the sample in accordance with an illustrative embodiment. FIG. 4C depicts microscopic images of the frosting process at a valley of the sample in accordance with an illustrative embodiment. For FIGS. 4B and 4C, the sample under the microscope lens has a vertex angle $\alpha=90°$ for better imaging, but was tested under the same conditions as in FIG. 4A. The tested surfaces were both hydrophobic, and the ambient humidity was 25% at 23° C.

Figure 4D:
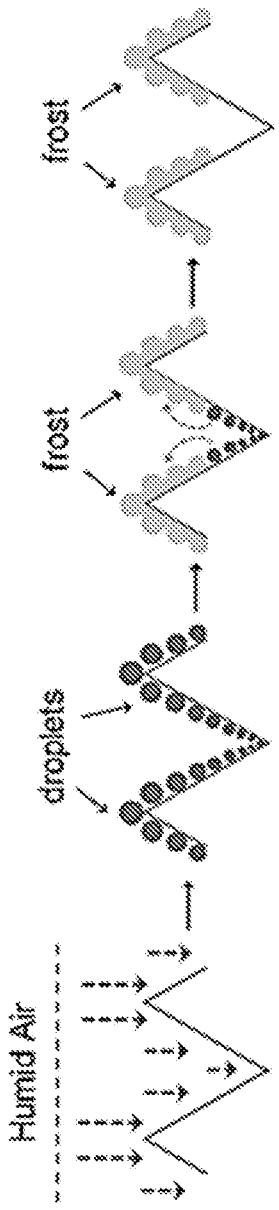
FIG. 4D schematically depicts the process of frost formation on a ridged sample in accordance with an illustrative embodiment.

Similar to FIG. 4A, the frosting process for the tests depicted in FIGS. 4B and 4C was also found to involve four stages. Dropwise condensation occurs across the whole surface at the first place, as shown in the uppermost images of FIGS. 4B and 4C. However, the size of supercooled drops is found to decrease from the peak to the valley, ranging from around 40 μm near the peak (in dashed circles) to less than 10 μm near the valley (in dashed circles). This droplet size distribution agrees with the previous observation that condensed droplets are larger on bumps than on dimples. These micrometer scale condensed droplets, which can effectively diffuse light, also explain the hazy features found in FIG. 4A. Following the first condensation stage, frosting initiates from the peak and quickly propagates without changing the pattern formed by the droplets (as shown in the middle image of FIG. 4B). This observation implies that the frost propagates by interconnecting adjacent droplets, which agrees with the ice-bridging model described in previous studies. When the ice front approaches the valley, droplets start to varnish. A gap forms between the ice front and the droplets near the valley as shown in the middle image of FIG. 4C. This gap prevents the invasion of frost further down to the valley. All the droplets on the right of the gap in the middle image of FIG. 4C eventually disappear in the bottom image of FIG. 4C, corresponding well with the disappearance of haze shown in FIG. 4A (t=910 sec to t=2270 sec). With the diminution of droplets in the valley, the frost front continues to slowly grow and becomes dendritic, which indicates the droplets may evaporate and then deposit onto the ice. This process is driven by the local concentration gradient of water vapor established by the different vapor pressure of ice and supercooled water. FIG. 4D schematically depicts the process of frost formation on a ridged sample in accordance with an illustrative embodiment.

Figure 5A:
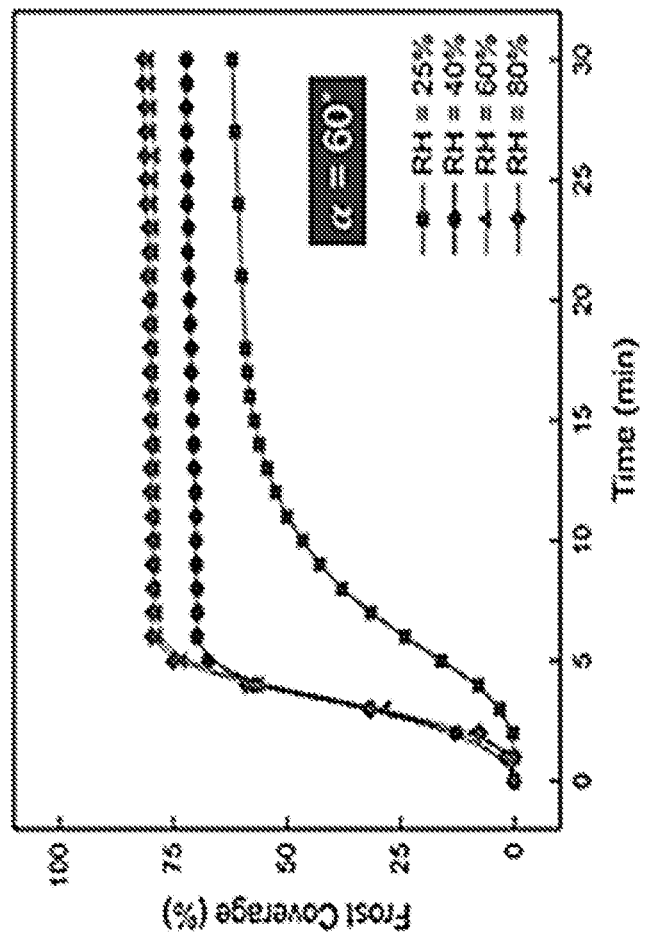
FIG. 5A depicts the percentage of frost coverage as time progresses for the various relative humidities in accordance with an illustrative embodiment
Figure 5E:
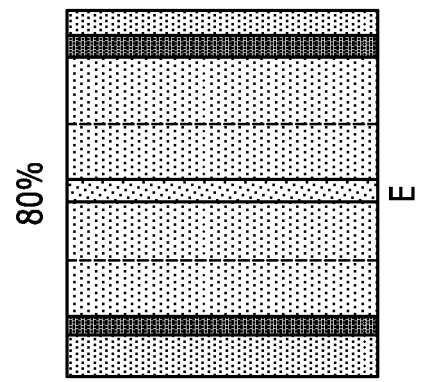
FIG. 5E depicts the frost pattern at t=30 minutes for a relative humidity of 80% in accordance with an illustrative embodiment.
Figure 5D:
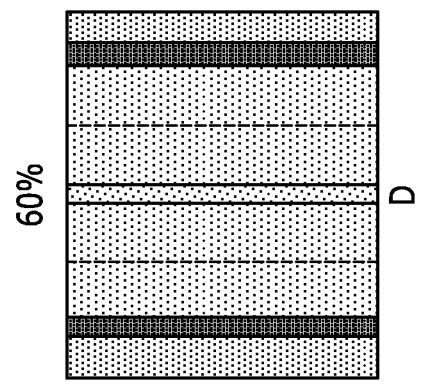
FIG. 5D depicts the frost pattern at t=30 minutes for a relative humidity of 60% in accordance with an illustrative embodiment.
Figure 5C:
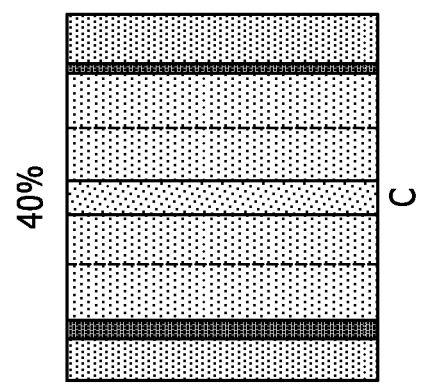
FIG. 5C depicts the frost pattern at t=30 minutes for a relative humidity of 40% in accordance with an illustrative embodiment.
Figure 5B:
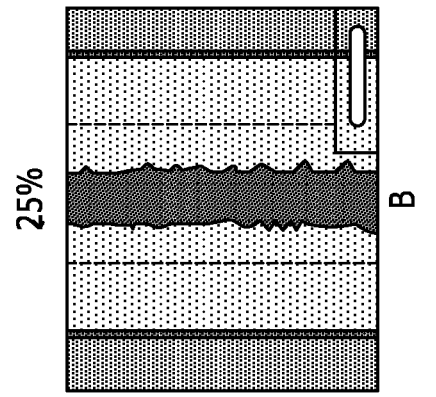
FIG. 5B depicts the frost pattern at t=30 minutes for a relative humidity of 25% in accordance with an illustrative embodiment.

With the surface geometry controlled to be $\alpha=60°$, samples were tested at four levels of ambient relative humidity RH=25%, 40%, 60% and 80%. In alternative embodiments, different relative humidities may be used such as 15%, 20%, 90%, etc. FIG. 5A depicts the percentage of frost coverage as time progresses for the various relative humidities in accordance with an illustrative embodiment. As shown, the non-frosted area shrinks as the ambient humidity levels increase. FIG. 5B depicts the frost pattern at t=30 minutes for a relative humidity of 25% in accordance with an illustrative embodiment. FIG. 5C depicts the frost pattern at t=30 minutes for a relative humidity of 40% in accordance with an illustrative embodiment. FIG. 5D depicts the frost pattern at t=30 minutes for a relative humidity of 60% in accordance with an illustrative embodiment. FIG. 5E depicts the frost pattern at t=30 minutes for a relative humidity of 80% in accordance with an illustrative embodiment. The dashed lines in FIGS. 5B-5E represent the peaks. As shown, the propagation and evaporation stages are noticeably slower for RH=25% than the other higher RH levels.

Figure 6A:
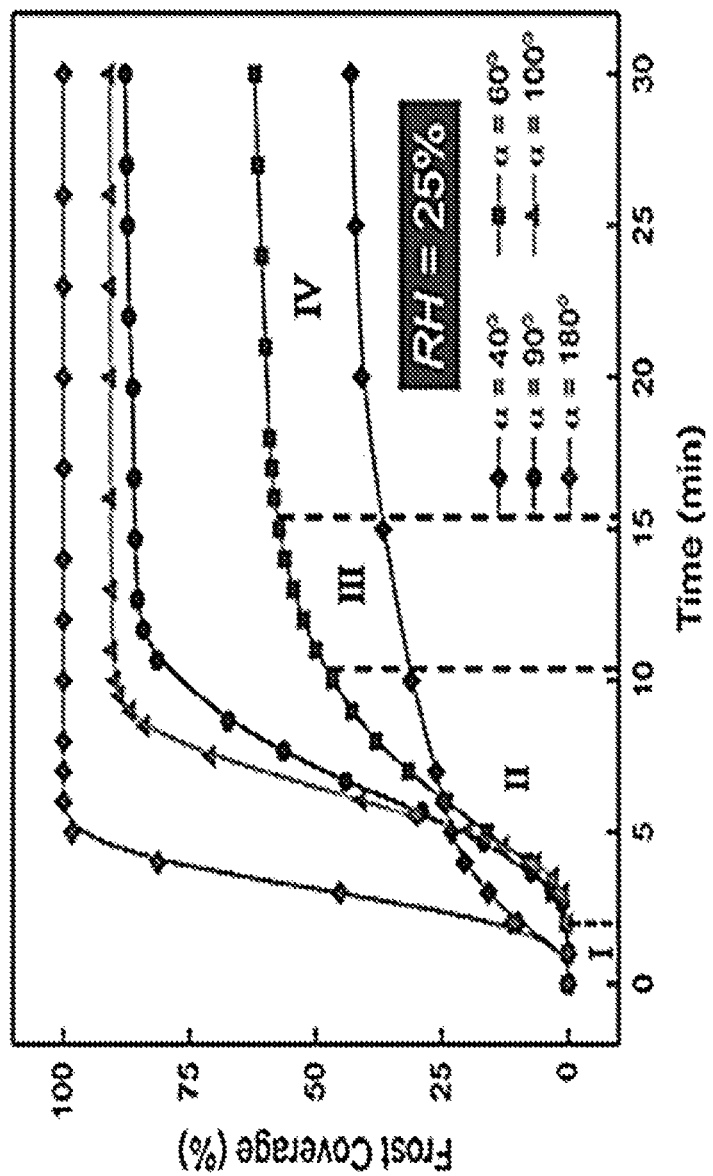
FIG. 6A depicts the time evolution of frost coverage on hydrophobic serrated samples for a plurality of vertex angles in accordance with an illustrative embodiment.
Figure 6D:
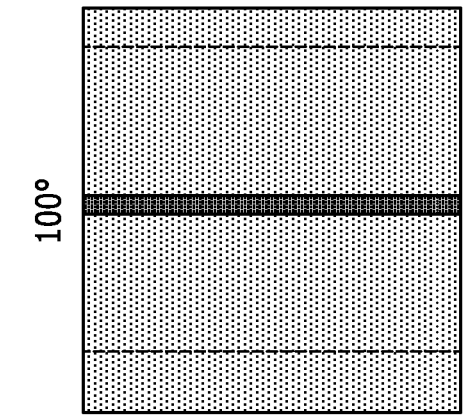
FIG. 6D depicts the frost pattern at t=30 minutes for a sample with a 100° vertex angle in accordance with an illustrative embodiment.
Figure 6C:
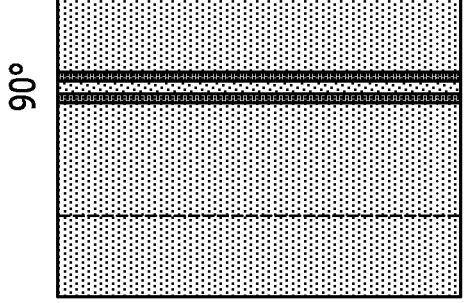
FIG. 6C depicts the frost pattern at t=30 minutes for a sample with a 90° vertex angle in accordance with an illustrative embodiment.
Figure 6B:
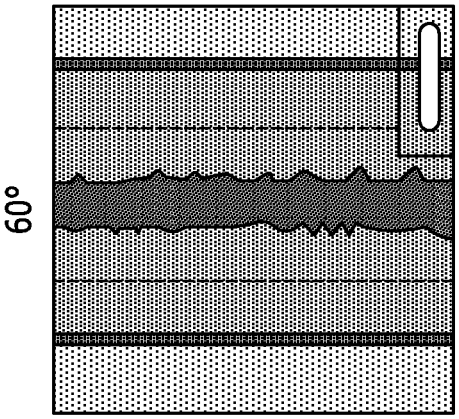
FIG. 6B depicts the frost pattern at t=30 minutes for a sample with a 60° vertex angle in accordance with an illustrative embodiment.
Figure 6G:
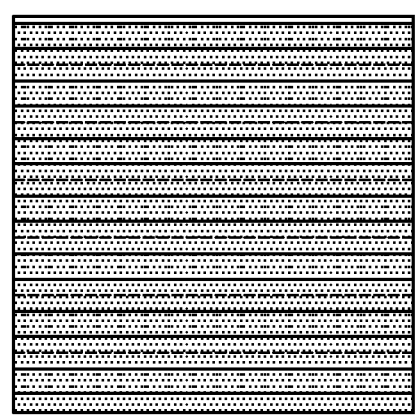
FIG. 6G depicts the frost pattern at t=5 hours for the sample with the 40° vertex angle in accordance with an illustrative embodiment.
Figure 6F:
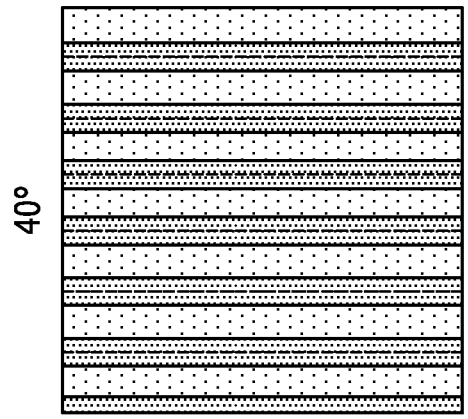
FIG. 6F depicts the frost pattern at t=30 minutes for a sample with a 40° vertex angle in accordance with an illustrative embodiment.
Figure 6E:
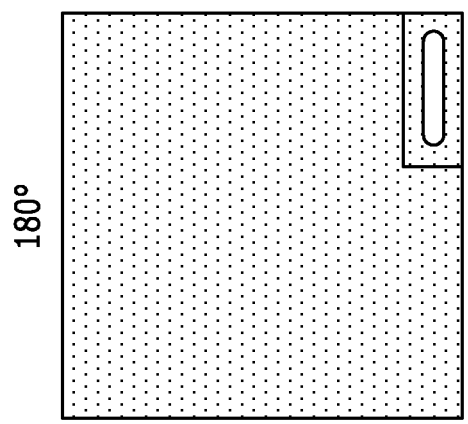
FIG. 6E depicts the frost pattern at t=30 minutes for a sample with a 180° vertex angle in accordance with an illustrative embodiment.

To quantitatively study the impact of surface geometry on the frost pattern, surfaces with various vertex angles were tested under RH=25%. For samples with $\alpha=60°$, $90°$, and $100°$, the frost coverage was evaluated between the two peaks since the surfaces were designed to have only two peaks. For $\alpha=40°$ and $180°$ (i.e., flat surface), the whole surface area was considered. FIG. 6A depicts the time evolution of frost coverage on hydrophobic serrated samples for a plurality of vertex angles in accordance with an illustrative embodiment. FIG. 6B depicts the frost pattern at t=30 minutes for a sample with a 60° vertex angle in accordance with an illustrative embodiment. FIG. 6C depicts the frost pattern at t=30 minutes for a sample with a 90° vertex angle in accordance with an illustrative embodiment. FIG. 6D depicts the frost pattern at t=30 minutes for a sample with a 100° vertex angle in accordance with an illustrative embodiment. FIG. 6E depicts the frost pattern at t=30 minutes for a sample with a 180° vertex angle in accordance with an illustrative embodiment. FIG. 6F depicts the frost pattern at t=30 minutes for a sample with a 40° vertex angle in accordance with an illustrative embodiment. The flat surface ($\alpha=180°$) shows the lowest resistance against frosting as it was completely covered by frost after 5 minutes. The surfaces with smaller vertex angles show better anti-frosting performance as indicated by the lower frost coverage stabilized at t=30 min. The surface with the smallest vertex angle ($\alpha=40°$) shows a frost coverage of less than 45% after 30 min. After 5 hours of experiments, the non-frosted area for the sample with a 40° vertex angle is still 49%. FIG. 6G depicts the frost pattern at t=5 hours for the sample with the 40° vertex angle in accordance with an illustrative embodiment.

Still referring to FIG. 6, the four stages described previously can also be identified in each curve with different time spans. The division of stages I-IV shown in FIG. 6A is based on $\alpha=60°$ (i.e., the line with squares). As shown, all of the surfaces start with a relatively short incubation period without any frost coverage, which corresponds to the condensation stage (Stage I). Then a stage where the frost coverage almost soars with time follows, indicating that the frost quickly propagates (Stage II). The transition period (Stage III) where the slope of the curves in FIG. 6A decreases from the linear portion in Stage II to almost 0 indicates that the droplets in the valley evaporate and accumulate onto the ice front. Finally, at Stage IV, frost mainly grows out of plane which increases the thickness of the frost cover, while the in-plane frost coverage shows a plateau regime suggesting the depletion of liquid drops in the valley.

Figure 7A:
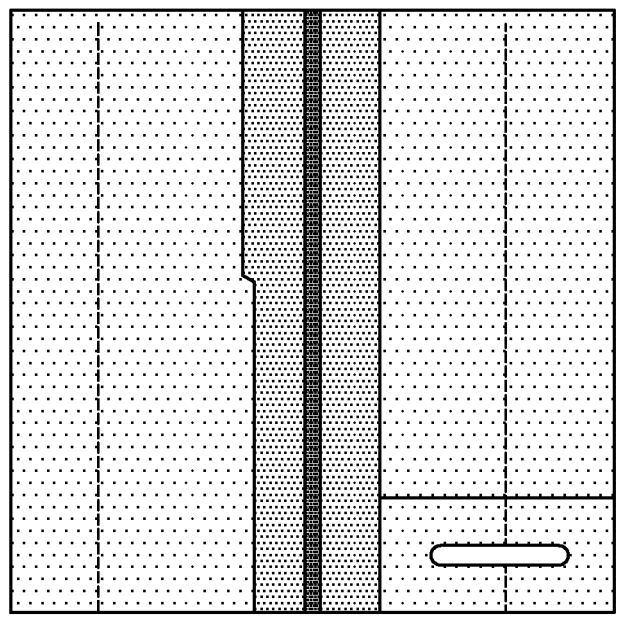
FIG. 7A shows the frost pattern on the superhydrophilic surface at t=0.5 minutes in accordance with an illustrative embodiment.
Figure 7B:
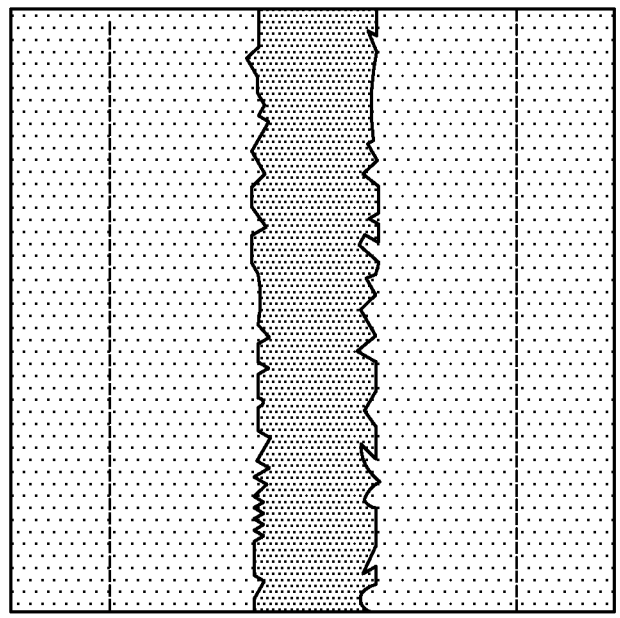
FIG. 7B shows the frost pattern on the superhydrophilic surface at t=30 minutes in accordance with an illustrative embodiment.

Different from the dropwise condensation on hydrophobic surfaces, water condensate spreads out as a thin film on superhydrophilic surfaces where $\theta^*\approx0°$. FIG. 7 shows the frost coverage between two peaks on a superhydrophilic surface with a vertex angle of $\alpha=60°$, where the ambient humidity was RH=25% at 23.5° C. FIG. 7A shows the frost pattern on the superhydrophilic surface at t=0.5 minutes in accordance with an illustrative embodiment. FIG. 7B shows the frost pattern on the superhydrophilic surface at t=30 minutes in accordance with an illustrative embodiment. The dashed lines in FIG. 7 indicate peaks.

Similar to the frost pattern observed on the hydrophobic surface, the valley is non-frosted on the superhydrophilic surface. However, the propagation and evaporation stages (Stage II and IV) are absent. Instead, the condensed liquid quickly freezes (t<1 min). This is presumably because the superhydrophilic surfaces facilitate nucleation of water by providing a high number density of high energy sites. The interdroplet distance is therefore shorter, and nucleated droplets quickly spread out due to the low $\theta^*$, interconnect, and turn into a film. The evaporation stage also becomes transient given both the suppressed condensation in the valley proved by the small droplet sizes shown in FIG. 4C (uppermost image), and the lack of time for droplet growth caused by the fast freezing. The slow increase in frost coverage (70% at t=0.5 min and 73% at t=30 min) agrees with slopes close to zero at Stage IV, as shown in FIGS. 5A and 6A. However, the frost coverage on the superhydrophilic surface at t=30 min (73%, FIG. 7B) is greater compared to that on the hydrophobic surface (61%, FIGS. 4A, 4B) with the same vertex angle and under the same ambient humidity. This can also be explained by the proximity between nucleated drops on superhydrophilic surfaces, which later easily combine to form a liquid film, and freeze collectively.

Figure 8A:
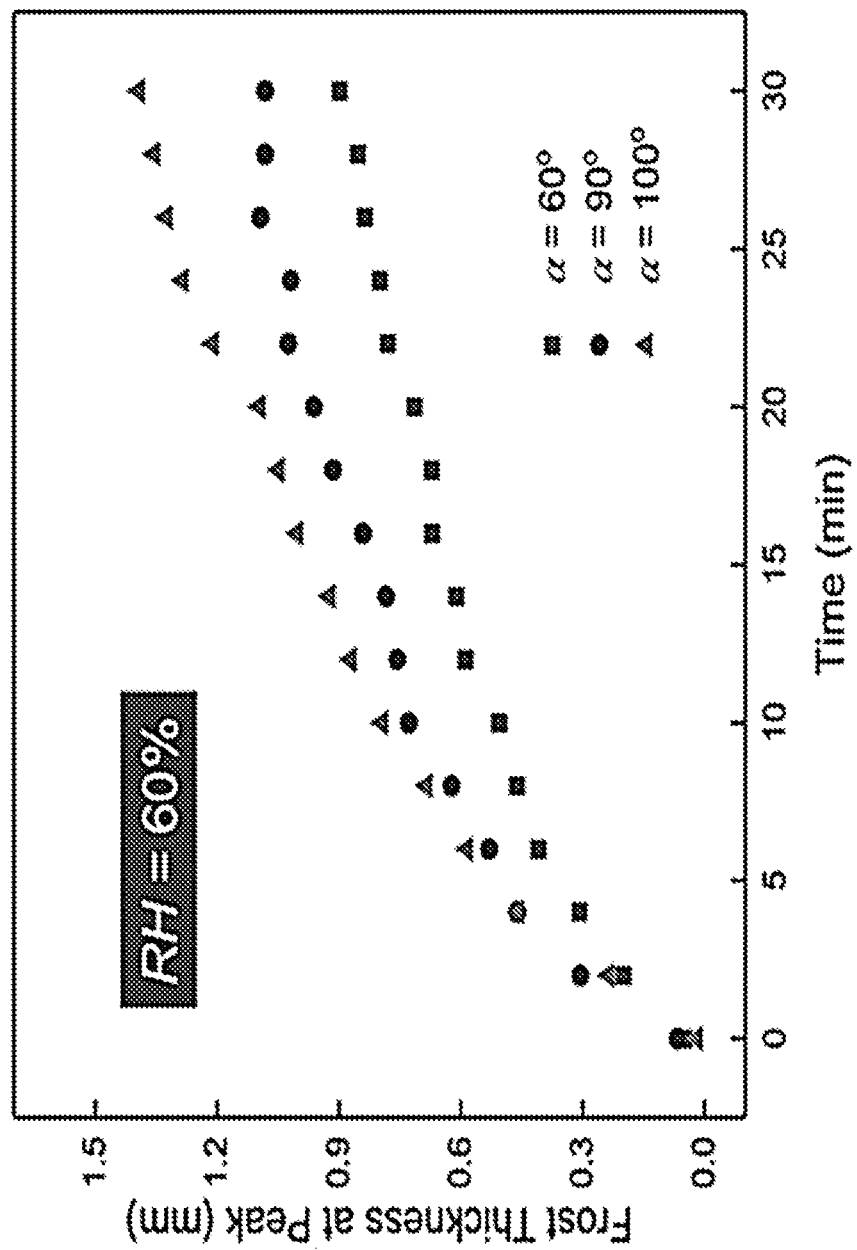
FIG. 8A depicts the time evolution of frost thickness at the peaks for superhydrophilic surfaces having vertex angles of 60°, 90°, and 100° in accordance with an illustrative embodiment.
Figure 8C:
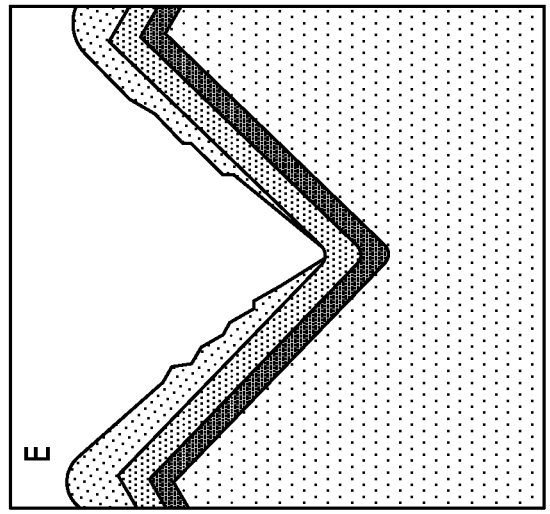
FIG. 8C is a cross-sectional view of frost cover on a superhydrophilic surface having a vertex angle of 60° in accordance with an illustrative embodiment.
Figure 8E:
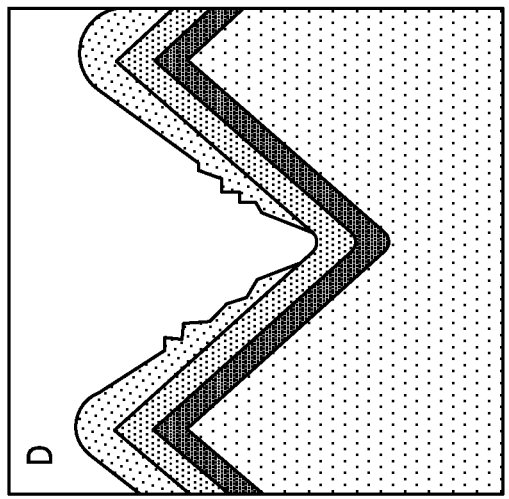
FIG. 8E is a cross-sectional view of frost cover on a superhydrophilic surface having a vertex angle of 100° in accordance with an illustrative embodiment.
Figure 8B:
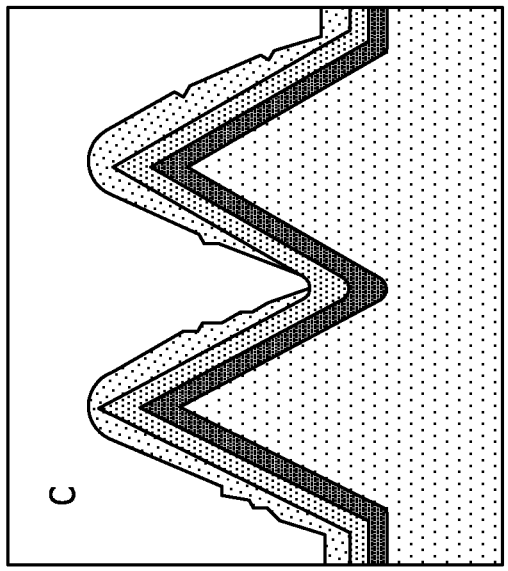
FIG. 8B is a cross-sectional view of frost cover on a hydrophobic surface having a vertex angle of 60° in accordance with an illustrative embodiment.
Figure 8D:
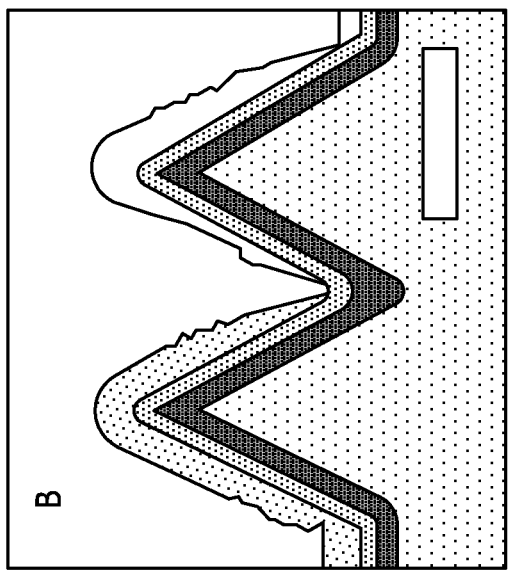
FIG. 8D is a cross-sectional view of frost cover on a superhydrophilic surface having a vertex angle of 90° in accordance with an illustrative embodiment.

The conducted experiments also indicate that ice grows and thickens out of plane following the initial coverage of the aluminum surfaces. Similar to the in-plane growth, condensation frosting also occurs during the out-of-plane growth. Because such out-of-plane growth occurs on ice which obscures the chemistry of the aluminum underneath, the frost cover shows a similar profile independent of surface wettability. FIG. 8A depicts the time evolution of frost thickness at the peaks for superhydrophilic surfaces having vertex angles of 60°, 90°, and 100° in accordance with an illustrative embodiment. FIG. 8B is a cross-sectional view of frost cover on a hydrophobic surface having a vertex angle of 60° in accordance with an illustrative embodiment. FIG. 8C is a cross-sectional view of frost cover on a superhydrophilic surface having a vertex angle of 60° in accordance with an illustrative embodiment. FIG. 8D is a cross-sectional view of frost cover on a superhydrophilic surface having a vertex angle of 90° in accordance with an illustrative embodiment. FIG. 8E is a cross-sectional view of frost cover on a superhydrophilic surface having a vertex angle of 100° in accordance with an illustrative embodiment. In the embodiments of FIGS. 8B-8E, t=10 minutes, ambient humidity was 60%, and the temperature was 23.5° C. In both the hydrophobic and superhydrophilic cases, frost thickness significantly decreases from the peak to the valley as shown in FIG. 8B-E. Such different rates of frost accumulation cannot be explained by the time delay of frosting near the valley, because film-wise frosting occurs and concurrently frost covers wherever the surface is wetted, as shown in FIG. 7. Instead, the different rates of frost accumulation indicate that the rate of mass transport from the ambient air onto the surface is affected by the local surface topography, which is faster near the peak and slower near the valley.

The effect of surface geometry on the rate of out-of-plane growth of frost was also studied. To exclude the delay of initiation of frosting depending on the vertex angle, superhydrophilic surfaces were used to test the serrated patterns. As discussed above, FIGS. 8B-D show profiles of the frost cover after 10 min of frosting for $\alpha=60°$, 90°, and 100°, and the time evolution of frost thickness at the peaks is plotted in FIG. 8A. Different from the previous observation of condensation on bumps which is enhanced by smaller radius of curvature, in this experiment the smallest vertex angle $\alpha=60°$ surprisingly shows the slowest rate of frost accretion. As the vertex angle increases, the frost grows faster at the peak. This indicates that the diffusion-driven mass transport is no longer the only important factor when frost grows out of plane.

Since the surface temperature of the aluminum samples was kept below the dew point under the aforementioned testing conditions, condensation occurs in the first place rather than direct frost deposition by ablimation even though surface temperature is below 0° C. ($T_{surface}=-12°$ C., $T_{dew}=1.9°$ C. for RH=25% and $T_{ambient}=23°$ C. Condensation therefore has a significant impact on the subsequent frosting process.

To explain the drop size distribution observed in FIGS. 4B-C, the diffusional transport of water vapor near the serrated features was numerically simulated. It was shown that, even though the concentration of water vapor is constant across the surface as defined in the boundary conditions (FIG. 3A), the concentration isolines are more densely distributed near the peaks while they are sparser near the valley. The denser isoline distribution implies a greater magnitude of concentration gradient $|\nabla c|$, and therefore a greater diffusion flux A as captured in FIG. 14C. Consequently, the number of molecules to impact onto the peaks is much greater than that into the valley per unit area and time. This explains the larger droplet size and number density at the peaks as compared to the valleys.

Following the condensation stage, ice can nucleate in a micro-droplet nearby a larger droplet to initiate propagation of the ice front. The likelihood for such micro-sized ice seeds to contact with a large droplet is much higher at the peak due to a higher number density of drops and greater size of them on the peak. Once frosting is initiated, the condensed drops near the ice front evaporate because of the lower vapor pressure of ice. The water vapor then deposits onto the ice front and fills the gap in between until the ice seeds reach nearby larger drops and initiate the freezing of those droplets. As a result, a larger number density of droplets means a shorter distance between the ice front and the nearby drops, and therefore a lower volume of the interdroplet space to be filled by the evaporation-deposition mechanism. Hence, a critical droplet size exists below which droplets will vanish before the space between ice and droplets is filled and frost propagation by interconnection will not occur. As discussed in more detail below, the low number density and small size of droplets at the valley caused by the extremely small magnitude of diffusion flux (see FIG. 14C) result in the complete evaporation of droplets before the ice-bridges reach the droplets, and hence the formation of the non-frosted band in the valley.

Figure 9B:
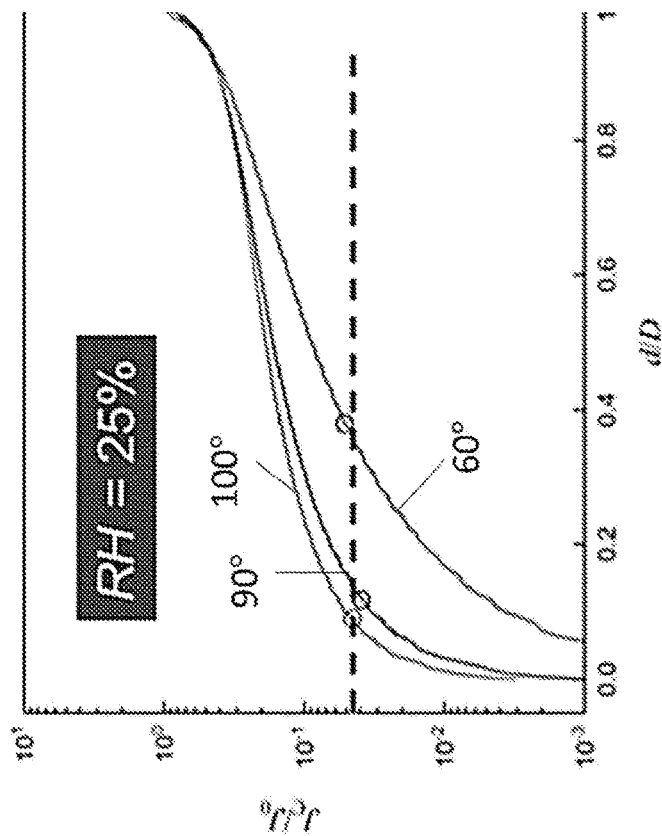
FIG. 9B depicts a distribution of the normalized diffusion flux from the valley to the peak for a relative humidity of 25% and vertex angles of 60°, 90°, and 100° in accordance with an illustrative embodiment.
Figure 9A:
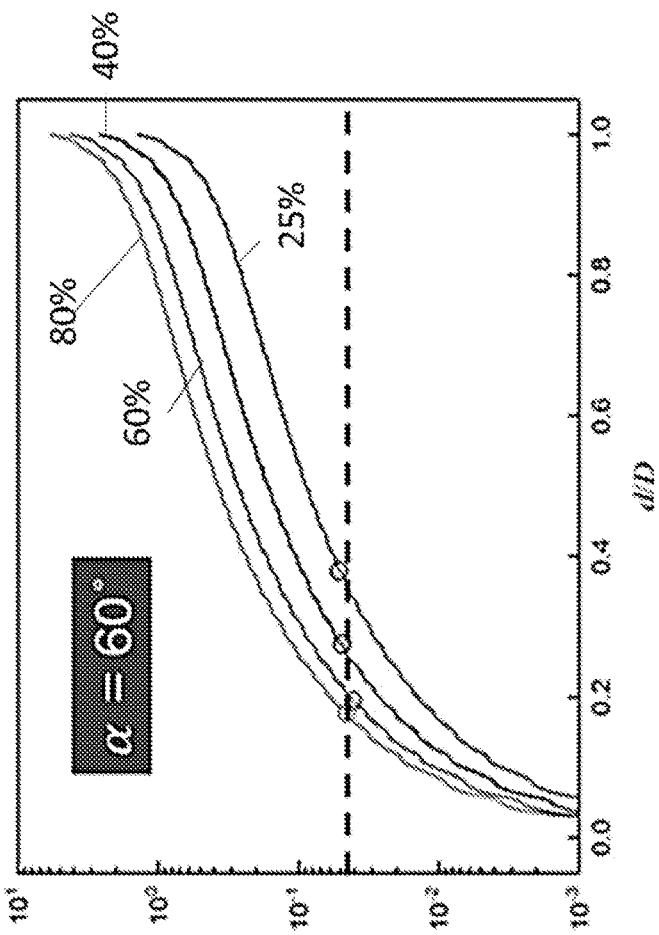
FIG. 9A depicts a distribution of the normalized diffusion flux from the valley to the peak for relative humidities of 25%, 40%, 60%, and 80% with a fixed vertex angle of 60° in accordance with an illustrative embodiment.

FIG. 9A depicts a distribution of the normalized diffusion flux from the valley to the peak for relative humidities of 25%, 40%, 60%, and 80% with a fixed vertex angle of 60° in accordance with an illustrative embodiment. FIG. 9B depicts a distribution of the normalized diffusion flux from the valley to the peak for a relative humidity of 25% and vertex angles of 60°, 90°, and 100° in accordance with an illustrative embodiment. In FIGS. 9C and 9D, the circles indicate similar $J_C/J_0$ at the mean positions of the frost front at t=30 minutes (Stage IV) for all levels of relative humidity and vertex angle.

The final frost pattern can also be affected by the size and number density of the condensed droplets. As shown in FIG. 9A, the $J_C/J_0$ increases when the ambient humidity level increases from 25% to 80% for the same type of surface geometry. On the other hand, the location that shows the same $J_C/J_0$ is closer to the valley when the relative humidity rises. It is also possible to estimate the $J_C/J_0$ near the frost front at the deposition stage (Stage IV) by assuming a straight frost front such that d/D of points on that line are identical. The spatial parameter d/D representing the mean frost front, d/D is hence evaluated by 1−f where f is the frost coverage stabilized at t=30 min. The open circles in FIG. 9A indicate such d̃/D at certain RH levels. The ordinate $J_C/J_0$ evaluated at d̃/D, $\tilde{J}_C/J_0$, is similar for all RH levels (black dashed line, $\tilde{J}_C/J_0 \approx 3.5 \times 10^{-2}$), which suggests the rate of condensation is similar where the ice front stops regardless of the ambient humidity. Such a critical value is also found when the ambient humidity is fixed and the surface geometry is altered, as shown in FIG. 9B. It is worth noting that even though $J_C/J_0$ at the peak (d/D→1) decreases as the vertex angle increases, it also decreases quickly when the location d/D moves away from the peak. For the vast majority of the flat area between the peak and valley where d/D<0.9, a smaller vertex angle shows smaller $J_C/J_0$. This implies that condensation and frosting on most surface areas are more suppressed when a smaller vertex angle is used.

However, out-of-plane growth of frost is more complicated. The underlying frost (on which moisture from the air deposits) acts as an insulating layer that inhibits heat transfer. Both diffusion driven mass transfer and heat transfer within the ice body need to be considered in this case. The mass transport can be similarly analyzed as in the in-plane growth. The extremely low magnitude of $J_C/J_0$ near the valley (see FIG. 14C) limits the transport of water vapor from the air onto the surface. The rate at which the frost thickness increases, ṙ, is thereby much slower in the valley than at the peak, which explains the much thinner frost cover at the valley compared to that at the peak, as shown in FIGS. 8B-8E.

Figure 10C:
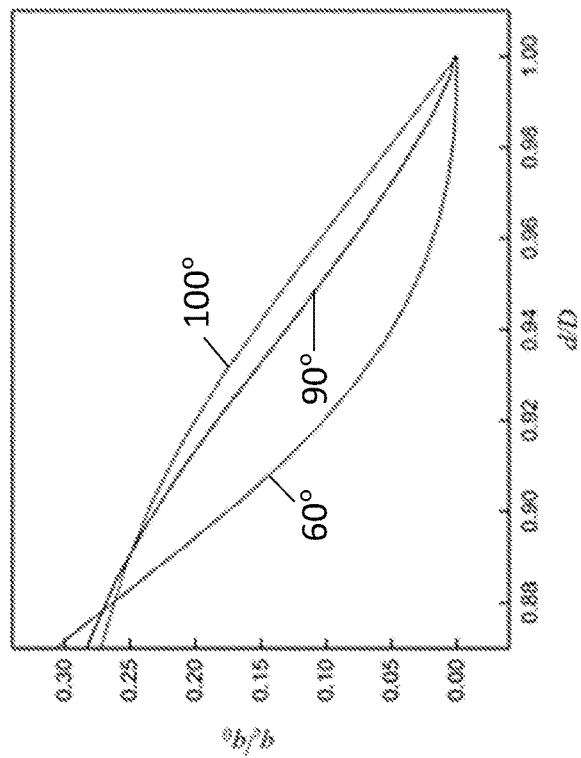
FIG. 10C depicts the distribution of normalized heat flux from the valley to the peak for vertex angles of 60°, 90°, and 100° in the simulation in accordance with an illustrative embodiment.
Figure 10A:
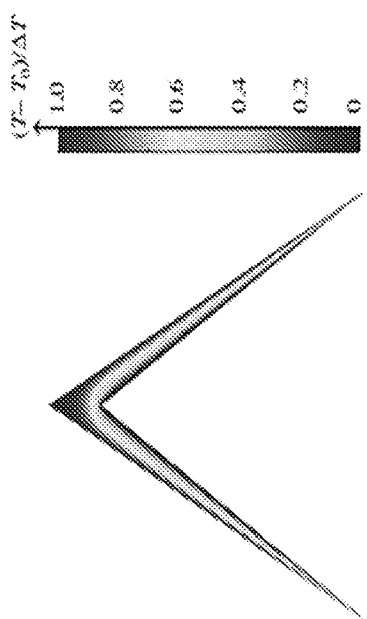
FIG. 10A depicts the temperature distribution in the heat transfer simulation in accordance with an illustrative embodiment.
Figure 10B:
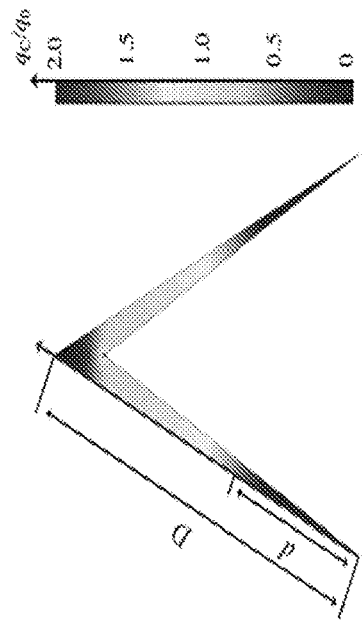
FIG. 10B depicts the normalized heat flux field distribution in the heat transfer simulation in accordance with an illustrative embodiment.

However, $J_C/J_0$ at the peak are comparable for the three α values, and slightly increases as α decreases, which contradicts the observation shown in FIG. 8A that ṙ at the peak decreases as α decreases. To reconcile this contradiction, the inventors simulated the heat transfer in the frost cover. FIG. 10A depicts the temperature distribution in the heat transfer simulation in accordance with an illustrative embodiment. FIG. 10B depicts the normalized heat flux field distribution in the heat transfer simulation in accordance with an illustrative embodiment. FIG. 10C depicts the distribution of normalized heat flux from the valley to the peak for vertex angles of 60°, 90°, and 100° in the simulation in accordance with an illustrative embodiment. In the simulation, there were fixed temperature differences between the upper and lower surfaces of the frost cover. Because the thickness of frost cover increases from the valley to the peak as captured in FIGS. 8B-E, $q_c/q_0$ maximizes at the valley and minimizes at the peak. The low magnitude of $q_c/q_0$ at the peak indicates that the frost growth at the peak may be limited by the compromised heat transfer caused by the underlying frost cover. As shown in FIG. 10C, for d/D<0.9, $q_c/q_0$ decreases as a decreases, which agrees with the smaller rate at which frost thickness increases at the peak for smaller a (FIG. 8A).

Additional tests and experiments were performed based on the aforementioned principles. For example, an experiment was conducted in which humidity of the test chamber was gradually increased by a humidifier positioned far away from the surface on which frosting was to occur. It was shown that there is no water nucleation in the valley if the surface is cooled first at RH=7%, and the humidity is gradually increased by the humidifier. The humidity was increased from 7% to 40% at a rate of 10% per minute. It was also shown that nucleated water droplets appear in/near the valley if the same surface is first isolated from the humid air (RH=40%) by a surface cover, which is then removed to expose the surface to the humid air. In this experiment, the surface was hydrophobic with a vertex angle of 60°, the surface temperature was 1° C. and the ambient temperature was 23.5° C.

Classical nucleation theory predicts the rate of a nucleation event r is given by:

$$r = r_0 \exp\left(\frac{-N_A}{RT} \frac{4\pi\gamma^3}{3\left(\frac{RT}{V_m}\ln\left(\frac{p}{p_{sat}}\right)\right)^2} f(\theta)\right), \quad \text{Eq. 1}$$

where $r_0$ is the kinetic constant of the embryo formation reaction. The value of $10^{30}$ m$^{-2}$ s$^{-1}$ is used for this quantity, which is higher than the maximum value reported in literature. Also in Equation 1, T is the surface temperature (261K), R is the gas constant (8.314 J K$^{-1}$ mol$^{-1}$), $N_A$ is the Avogadro constant (6.022×10$^{23}$ mol$^{-1}$), γ is surface energy of the nucleated clusters (0.0779 J m$^{-2}$ for water and 0.1004 J m$^{-2}$ for ice at 261 K), $V_m$ is molar volume of the nucleated clusters (approximately 1.8×10$^{-5}$ m$^3$ mol$^{-1}$ for water and 1.96×10$^{-5}$ m$^3$ mol$^{-1}$ for ice), f(θ) is the shape factor related to the intrinsic contact angle (θ) of the nucleated species on the surface (this value can be evaluated by (2+cos θ)(1−cos θ)$^2$ if the nucleated cluster is assumed to be in the shape of a spherical cap), p is the ambient pressure of water vapor, and $p_{sat}$ is the equilibrium vapor pressure of the nucleated species at the surface temperature (223 Pascals (Pa) for water and 197 Pa for ice at 261 K). It is noted that Equation 1 can result in significant errors in practice due to the fact that the nucleus of critical size typically consists of less than 100 molecules, and the energy-related parameters including $\gamma$, $p_{sat}$, and $\theta$ of a cluster of that size can be very different than what is macroscopically observed.

Figure 11:
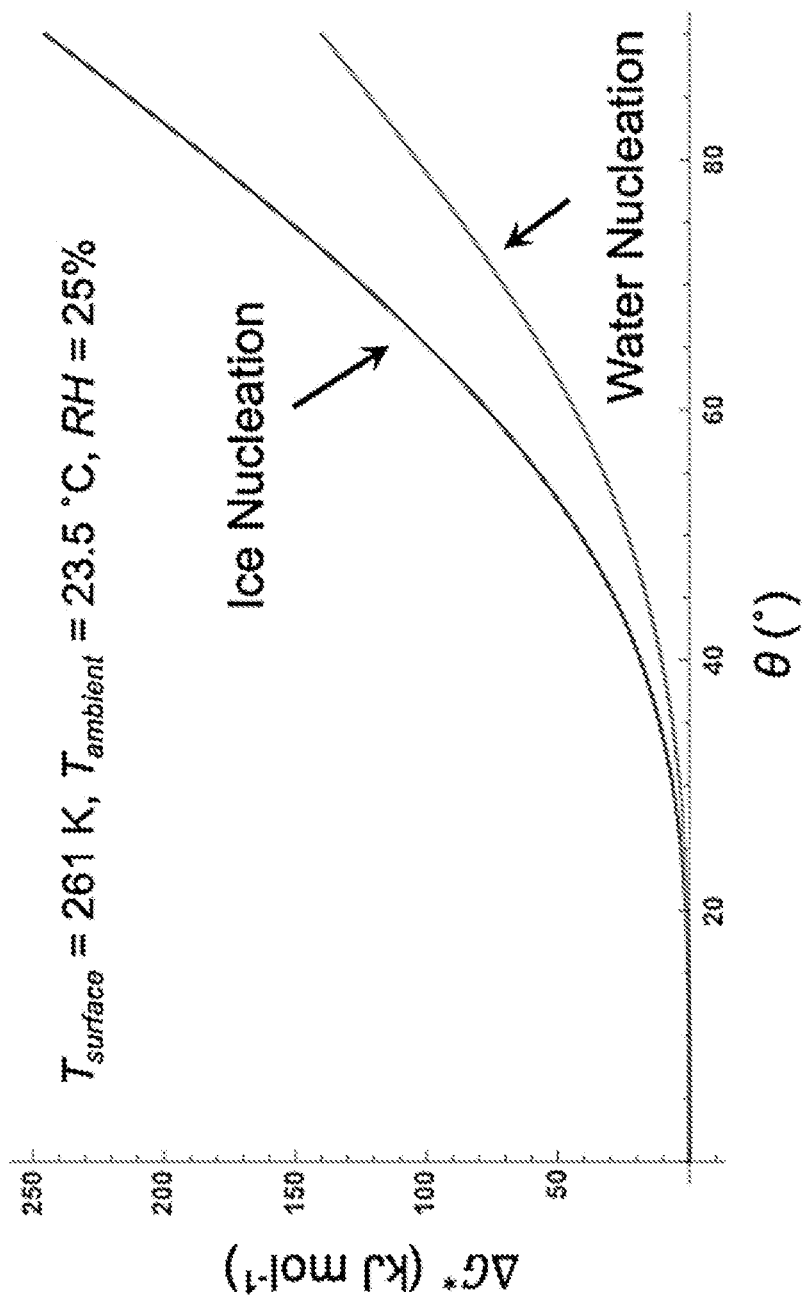
FIG. 11 is a diagram that depicts ice nucleation and water nucleation as a function of equilibrium contact angle $\theta$ in accordance with an illustrative embodiment.

FIG. 11 depicts an application of the above-described relationship in Equation 1. Specifically, FIG. 11 is a diagram that depicts ice nucleation and water nucleation as a function of equilibrium contact angle $\theta$ in accordance with an illustrative embodiment. As shown, the energy barrier of ice/supercooled water nucleation ($\Delta G^*$) increases as the equilibrium contact angle ($\theta$) increases. The difference in their nucleation energy barrier also increases as $\theta$ increases.

Figure 12B:
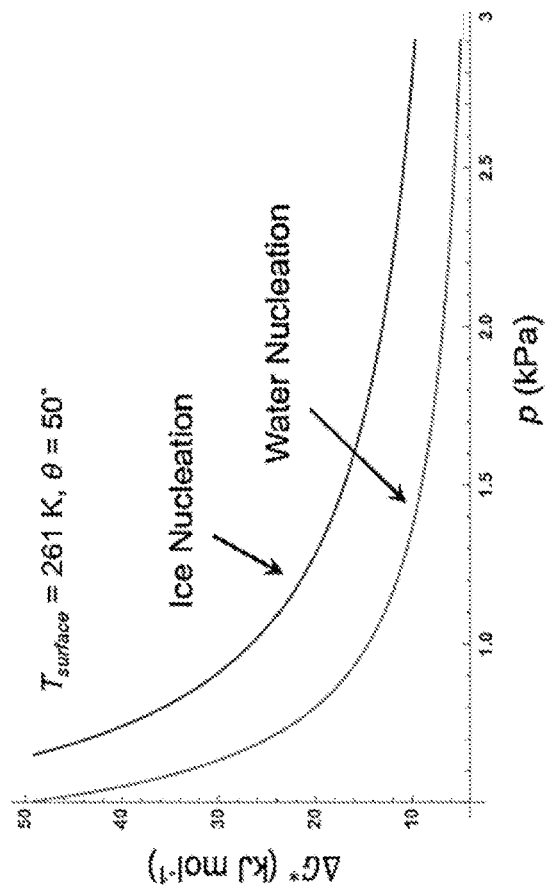
FIG. 12B depicts nucleation as a function of vapor pressure that is significantly greater than $p_{sat,w}$ in accordance with an illustrative embodiment.
Figure 12A:
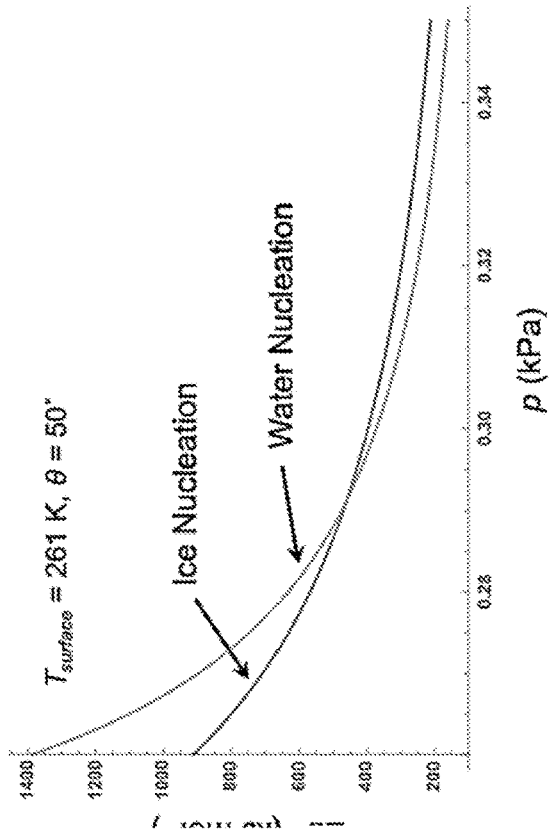
FIG. 12A depicts nucleation as a function of vapor pressure that approaches $p_{sat,w}$ (0.223 kPa) in accordance with an illustrative embodiment.
Figure 13:
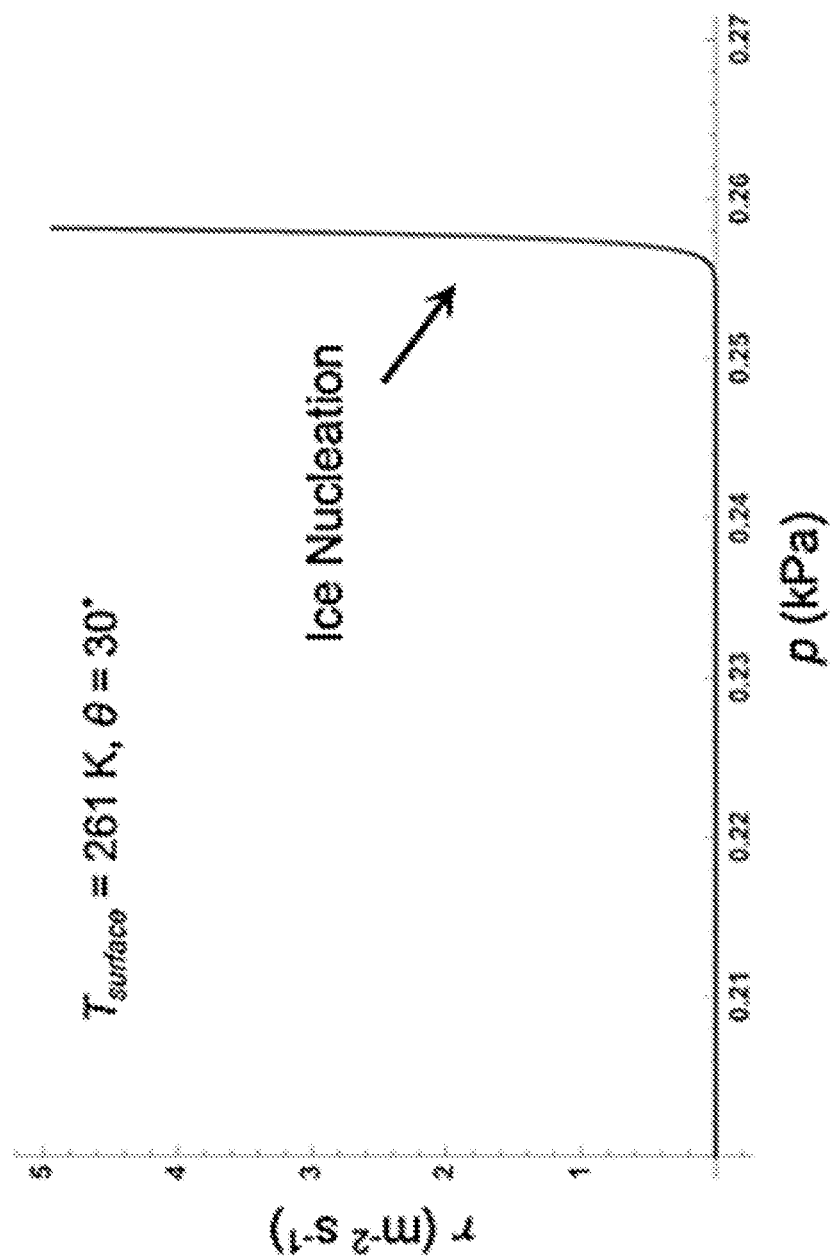
FIG. 13 depicts how the ice nucleation rate rapidly increases as the ambient vapor pressure increases in accordance with an illustrative embodiment.

It has also been shown that the energy barrier of ice/supercooled water nucleation ($\Delta G^*$) decreases as the ambient vapor pressure of water increases. FIG. 12A depicts nucleation as a function of vapor pressure that approaches $p_{sat,w}$ (0.223 kPa) in accordance with an illustrative embodiment. Specifically, FIG. 12A shows that $\Delta G^*_{water}$ is greater than $\Delta G^*_{ice}$ when the pressure approaches $p_{sat,w}$. FIG. 12B depicts nucleation as a function of vapor pressure that is significantly greater than $p_{sat,w}$ in accordance with an illustrative embodiment. As shown in FIG. 12B, $\Delta G^*_{water}$ is less than $\Delta G^*_{ice}$ when the pressure is significantly greater than $p_{sat,w}$. FIG. 13 depicts how the ice nucleation rate rapidly increases as the ambient vapor pressure increases in accordance with an illustrative embodiment.

Figure 14A:
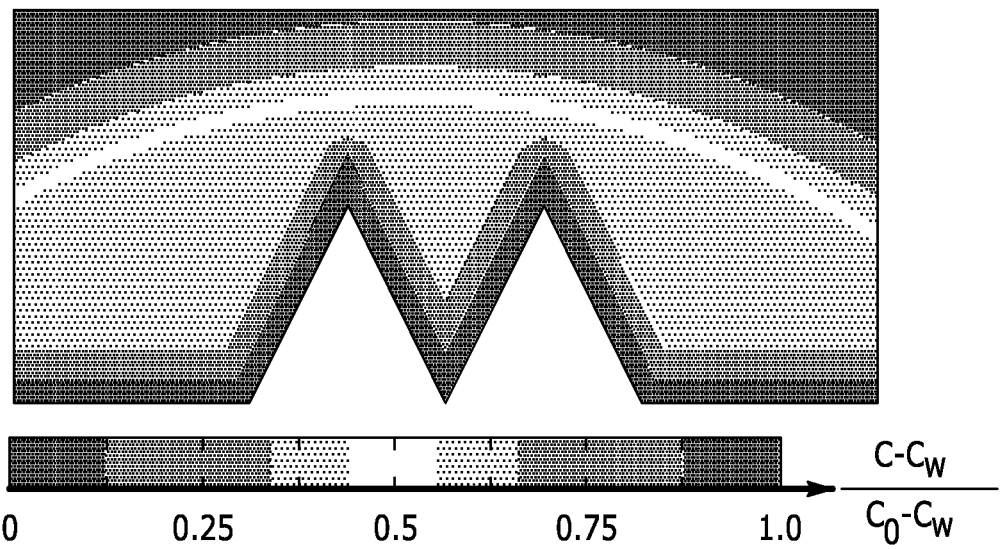
FIG. 14A depicts the concentration field of water vapor that results from solving the Laplace equation with the boundary conditions of FIG. 3A in accordance with an illustrative embodiment.

In additional experiments, a steady state diffusion model was assumed and the in-plane convection was ignored such that the Laplace equation is satisfied. The thickness of the diffusion boundary layer $\xi$ was assumed to be 1 cm based on prior research. The variable $c_w$ was set to be the equilibrium vapor pressure of supercooled water at the surface temperature (−12° C.), i.e. 223 Pa, or equivalently 0.091 mol/m$^3$ at ambient temperature (23.5° C.), and the variable $c_0$ is set to be the water vapor concentration in the ambient air, which is 0.29 mol/m$^3$ if RH=25% at 23.5° C. As discussed above, FIG. 3A depicts these boundary conditions for simulating diffusion of water vapor during the condensation stage. FIG. 14A depicts the concentration field of water vapor that results from solving the Laplace equation with the boundary conditions of FIG. 3A in accordance with an illustrative embodiment. As shown, the concentration isolines gradually curve toward the serrated features.

Figure 14B:
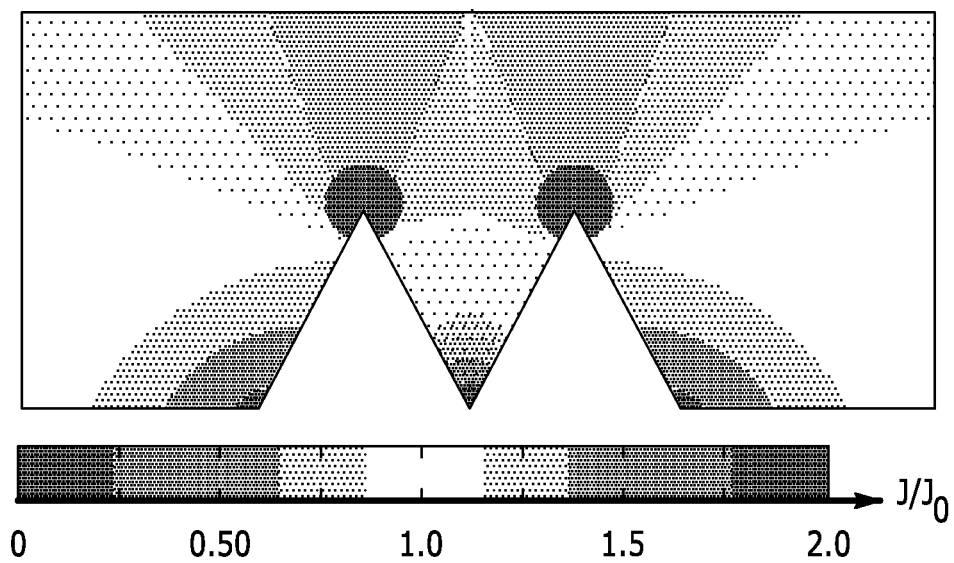
FIG. 14B depicts the distribution of the magnitude of diffusion flux (J) near the serrated features after being normalized by $J_0=(c_0-c_w)/\xi$ accordance with an illustrative embodiment.

Still referring to FIG. 14, the local condensation rate is characterized by the amount of water molecules diffusing onto the surface per unit time, or the magnitude of diffusion flux J, which is governed by Fick's first law of diffusion $J=D|\nabla c|$, where $D\approx0.28$ cm$^2$ s$^{-1}$ is the mass diffusivity of water vapor in air at 23.5° C., and $|\nabla c|$ is the magnitude of local concentration gradient determined by the concentration field at steady state. FIG. 14B depicts the distribution of the magnitude of diffusion flux (J) near the serrated features after being normalized by $J_0=(c_0-c_w)/\xi$ in accordance with an illustrative embodiment. As shown, J is maximized at the two peaks and minimized in the valley, meaning that more water vapor diffuses to the peaks than the valley, although the concentration is constant regardless of the local topography, as shown in FIG. 14A. This interpretation agrees with the observation of droplet sizes decreasing from the peaks to the valley, and as another example of the convex/concave topography, it supports the previous results of dropwise condensation on the bump/dimple structures.

Figure 15:
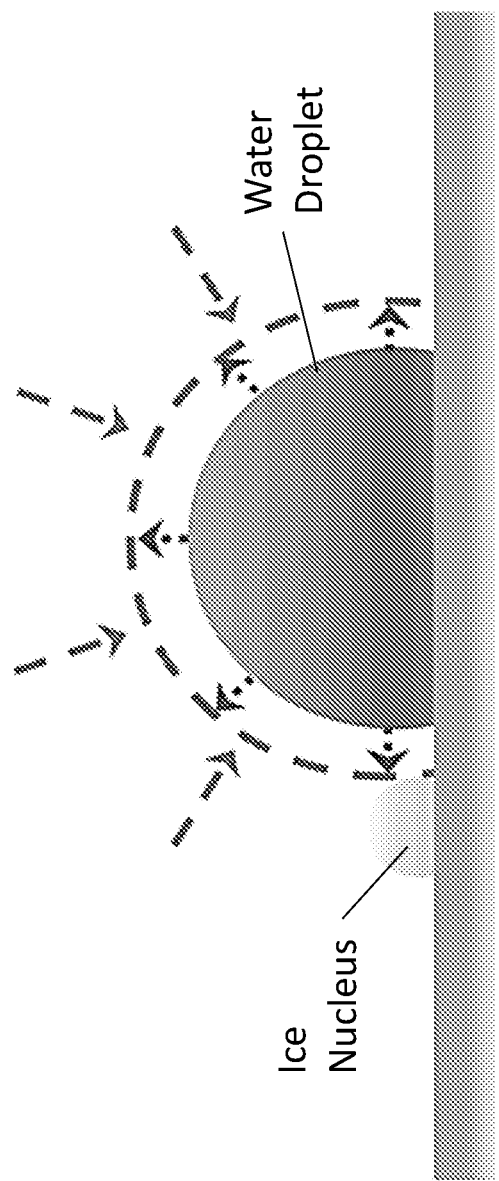
FIG. 15 is a schematic showing the interaction of a supercooled water droplet (right) and a nearby ice nucleus (left) in accordance with an illustrative embodiment.

FIG. 15 is a schematic showing the interaction of a supercooled water droplet (right) and a nearby ice nucleus (left) in accordance with an illustrative embodiment. FIG. 15 also depicts growth of the supercooled water droplet by diffusion and/or coalescence with other droplets. The freezing event can be triggered by a high energy site such as ice nucleus, or surface imperfections. In FIG. 15, the inward facing arrows (relative to the supercooled water droplet) represent the diffusion flux of water vapor and the outward facing arrows represent the growth in size of the supercooled water droplet.

Figure 16:
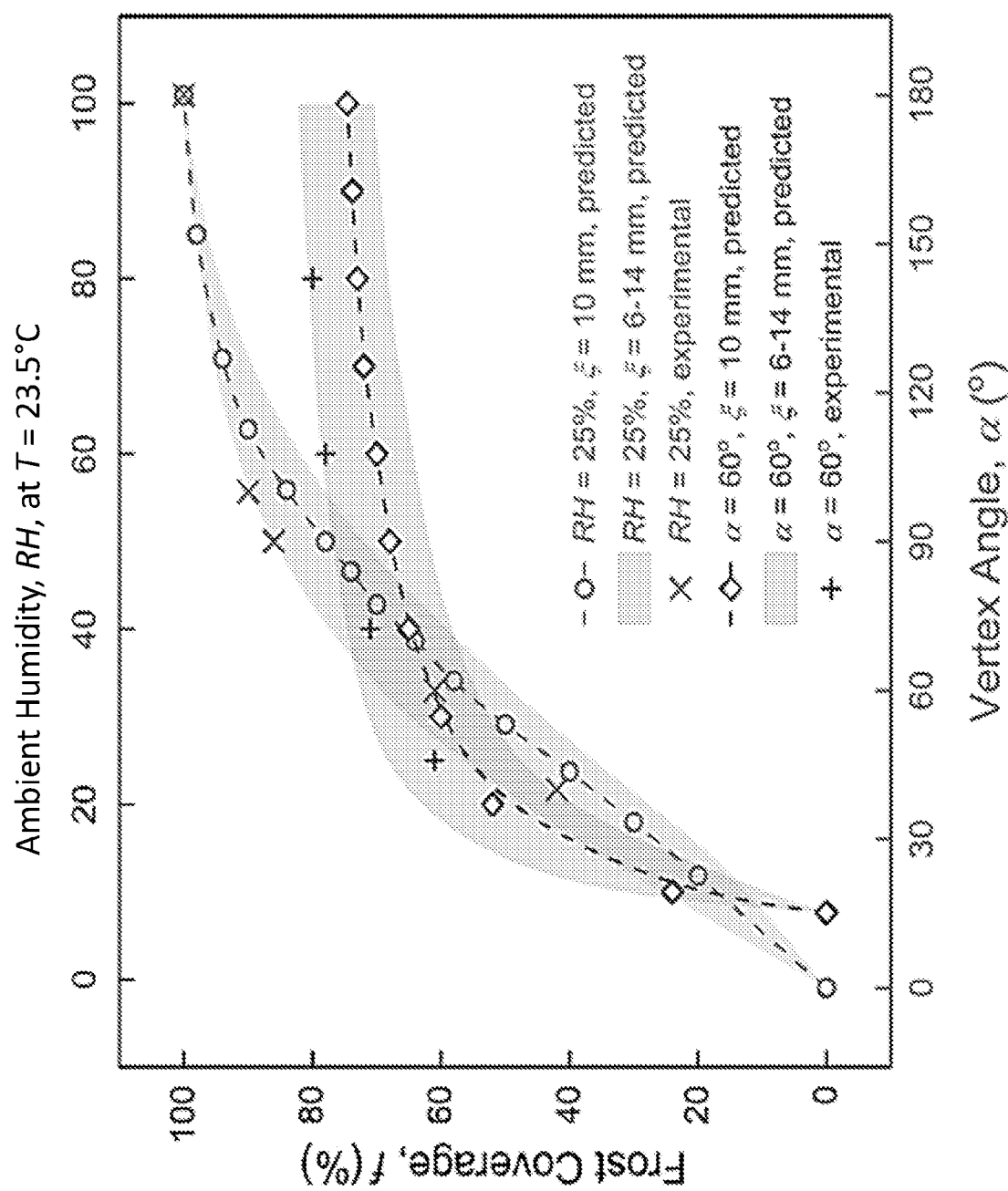
FIG. 16 depicts experimental and simulated critical frost coverage for different ranges of vertex angle and relative humidity in accordance with an illustrative embodiment.

FIG. 16 depicts experimental and simulated critical frost coverage for different ranges of vertex angle and relative humidity in accordance with an illustrative embodiment. Specifically, FIG. 16 shows experimental and simulated critical frost coverage when RH=25% and 0°<$\alpha$<180°, and for $\alpha$=60° with 10%<RH<100%. The bands represent simulated results using 6 mm≤$\xi$≤14 mm, where $\xi$ is the diffusion boundary layer thickness. Simulations are based on the evaporation model. A higher frost coverage (f→1) for a smaller $\xi$ value ($\xi$→0) was also experimentally observed, which is consistent with the observation that the frost growth is faster on the side edge of the sample compared to in the middle of the sample.

Figure 17A:
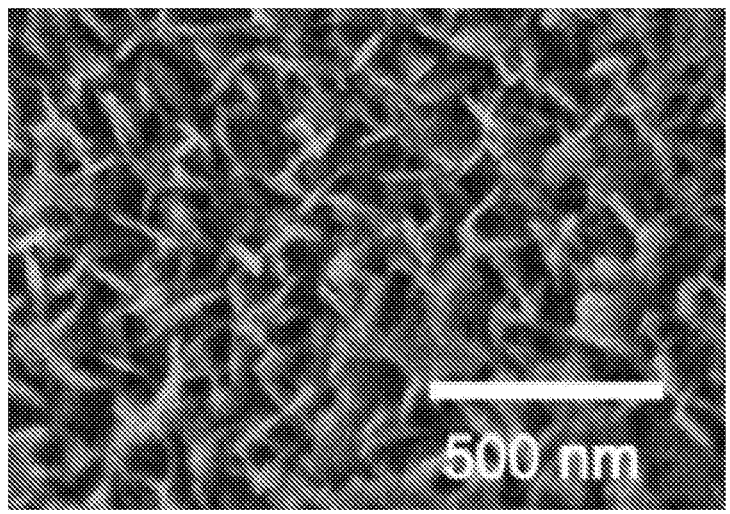
FIG. 17A depicts the nanostructure of a boehmitized superhydrophilic aluminum surface in accordance with an illustrative embodiment.
Figure 17B:
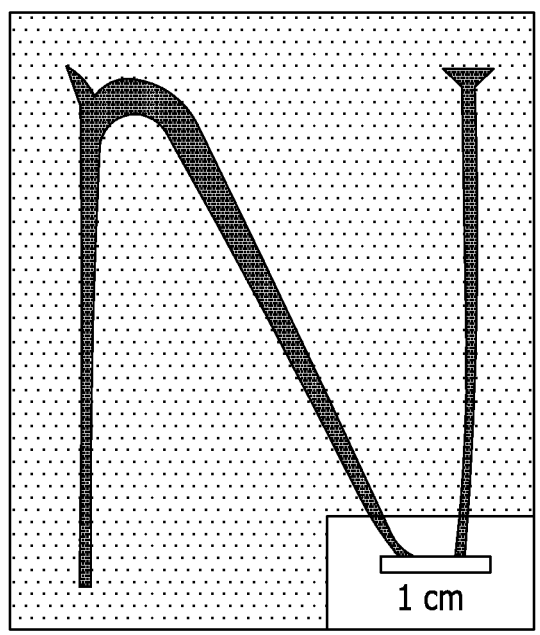
FIG. 17B depicts the frost-free zone on a plastic surface in accordance with an illustrative embodiment.
Figure 17C:
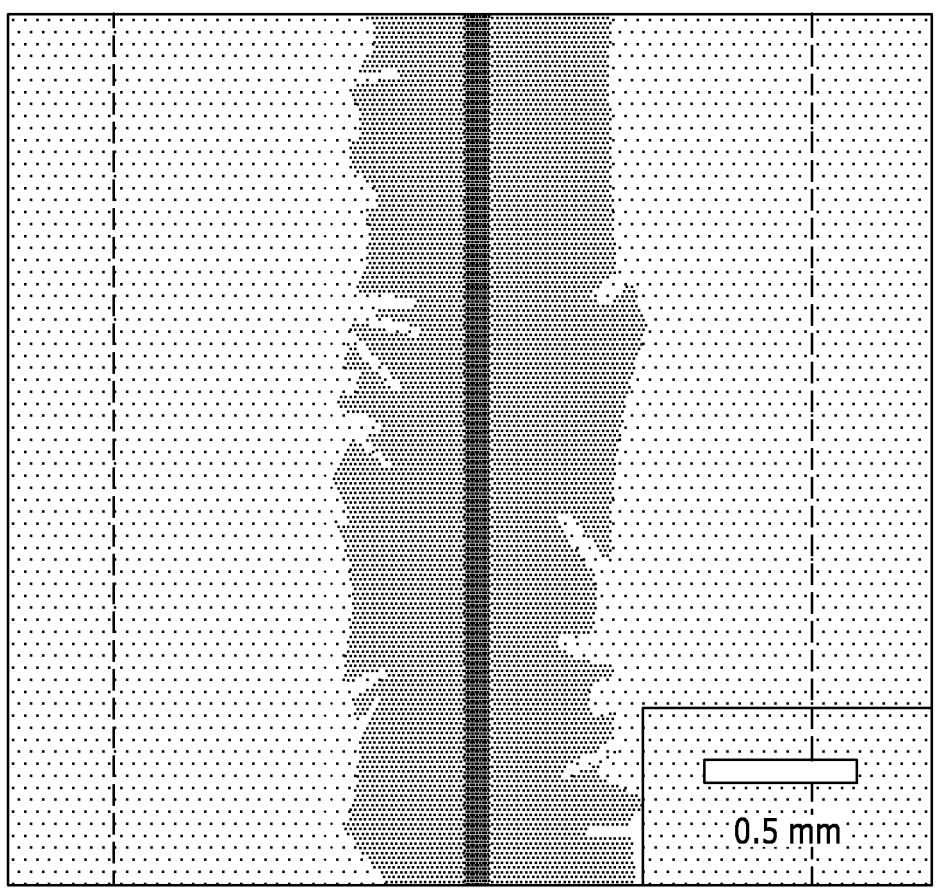
FIG. 17C depicts the frost-free zone on a hydrophobic aluminum surface with a peak height of 2 mm in accordance with an illustrative embodiment.

Although aluminum was used for many of the tests described herein, the principles described herein are not limited to aluminum surfaces. Other surfaces can also be used such as other metals (e.g., steel, stainless steel, copper, lead, plastic, glass, concrete, etc.). FIG. 17A depicts the nanostructure of a boehmitized superhydrophilic aluminum surface in accordance with an illustrative embodiment. The frost pattern on the superhydrophilic aluminum surface at t=0.5 minutes is shown in FIG. 7A, and the frost pattern on the superhydrophilic aluminum surface at t=30 minutes is shown in FIG. 7B. As shown in FIGS. 7A and 7B, the superhydrophilic aluminum surface has thermal conductivity of ~218 W m$^{-1}$K$^{-1}$, a vertex angle of 60°, and a peak wave height of 5 mm in the direction normal to the main surface plane. The ambient humidity was 25% at a temperature of 23.5° C. The dashed lines in FIGS. 7A and 7B represent peaks. FIG. 17B depicts the frost-free zone on a plastic surface in accordance with an illustrative embodiment. The plastic surface has a thermal conductivity less than 1 W m$^{-1}$K$^{-1}$, and includes an N-shaped pattern. The plastic surface was 3D-printed with methacrylic acid esters (e.g., RS-F2-GPCL04, Formlabs) and has a thickness of 0.5 mm. The grooves in the plastic surface are 5 mm in depth, and the relative humidity was 40% at T=23.5° C. FIG. 17C depicts the frost-free zone on a hydrophobic aluminum surface with a peak height of 2 mm in accordance with an illustrative embodiment. The peak height of 2 mm is nearly identical to the length scale of leaf veins as shown in FIGS. 1A and 1B. In FIG. 17C, the vertex angle $\alpha$=60°, and RH=25% at T=23.5° C. The dashed lines again indicate peaks.

Figure 19B:
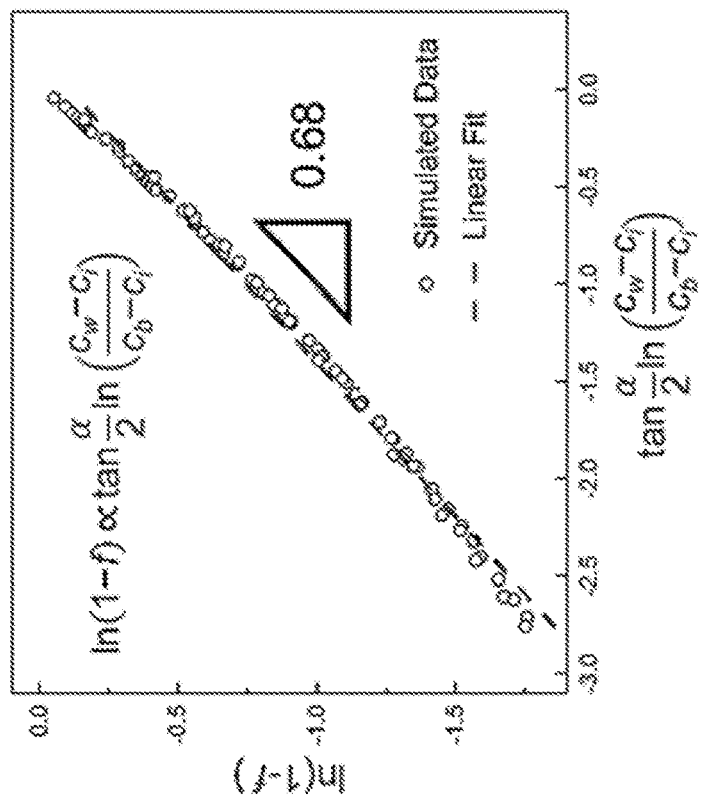
FIG. 19B depicts the scaling relation between the frost-free zone and the combined parameter $\alpha$ and $c_b$ in accordance with an illustrative embodiment.
Figure 19A:
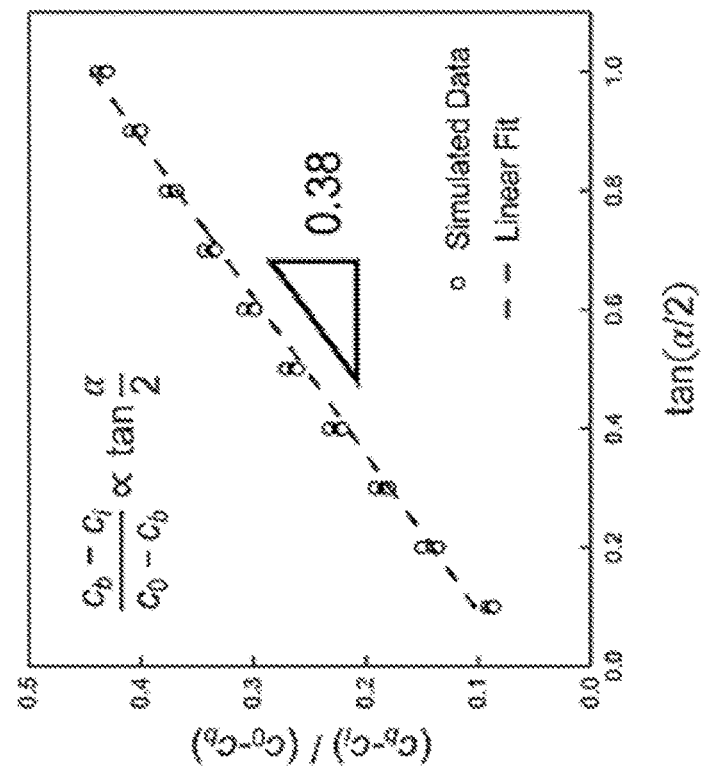
FIG. 19A depicts a scaling relation that connects the concentration at the boundary of the vapor and solid domain ($c_b$) with the geometric parameter $\alpha$ and the ambient water vapor concentration ($c_0$) in accordance with an illustrative embodiment.
Figure 19C:
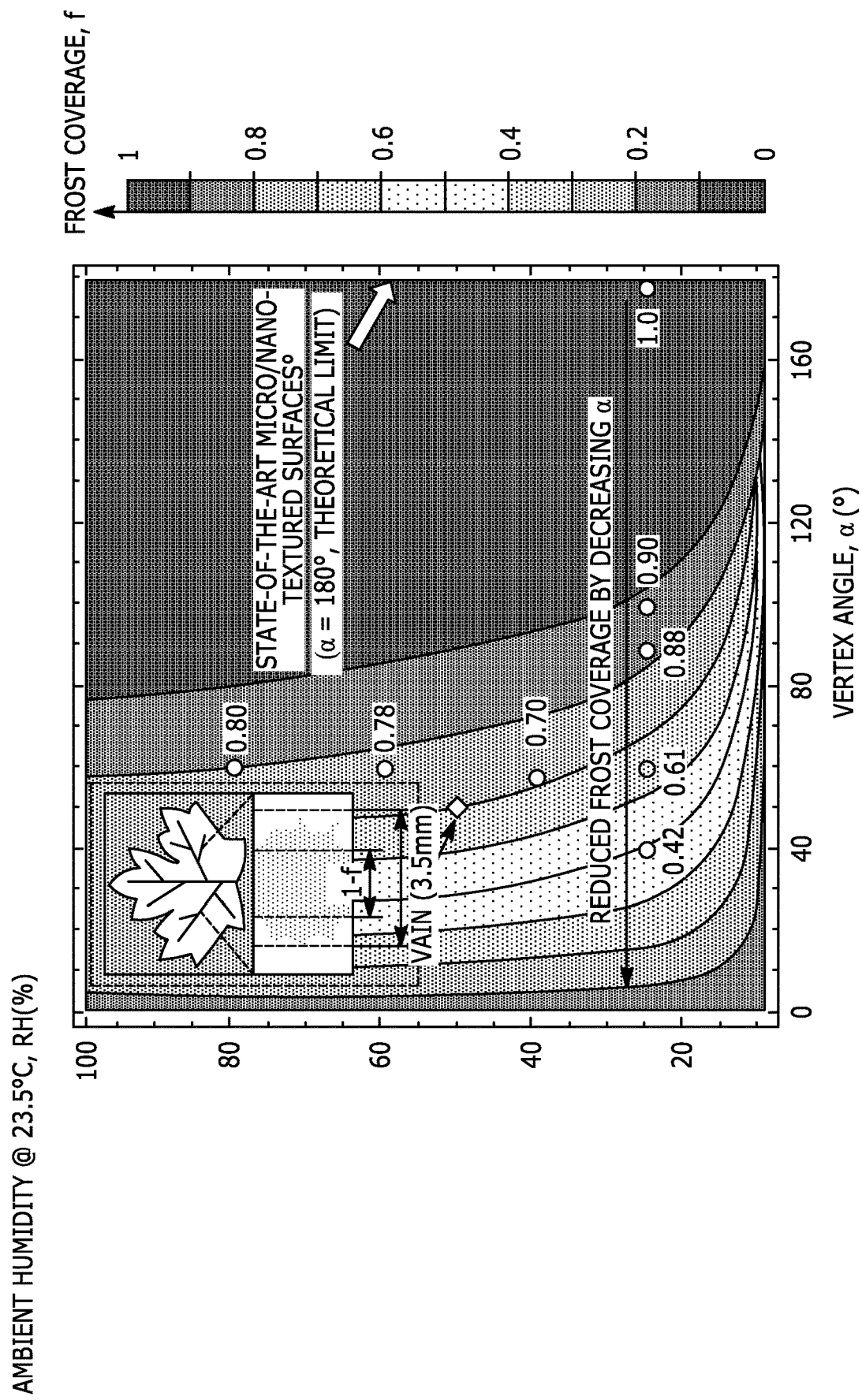
FIG. 19C depicts a map of the frost-free zone as a function of the vertex angle $\alpha$ and ambient relative humidity in accordance with an illustrative embodiment.

Referring now to FIG. 19, FIG. 19A depicts a scaling relation that connects the concentration at the boundary of the vapor and solid domain ($c_b$) with the geometric parameter $\alpha$ and the ambient water vapor concentration ($c_0$) in accordance with an illustrative embodiment. FIG. 19B depicts the scaling relation between the frost-free zone and the combined parameter $\alpha$ and $c_b$ in accordance with an illustrative embodiment. Simulated data points are based on the evaporation model using 20°≤$\alpha$<90°, and 20%≤RH≤100%. FIG. 19C depicts a map of the frost-free zone as a function of the vertex angle $\alpha$ and ambient relative humidity in accordance with an illustrative embodiment. While state-of-the-art micro/nano-textured surfaces shown no frost-free zone (i.e., 100% frost coverage), the vein of the artificial leaf ($\alpha=45°$) and a serrated surface with $\alpha=40°$ show the predicted frost-free zone (i.e., 50% frost coverage) for 5 hours under a similar frost condition (RH=25-50%, surface temperature<10° C.

Tests and calculations were also performed to estimate the concentration of water vapor on the y-axis (i.e., c(x=0, y)). These tests and calculations use the coordinates and boundary conditions set by the evaporation model in FIG. 3A. The Laplace equation was separately solved for c(x,y) in the vapor, solid, and liquid domains. A general solution to the mixed boundary condition problem in the gas domain is as follows:

$$c(x, y) = c_0 + a_0 y + \Sigma_{n \geq 1} a_n \frac{\sinh\left(\frac{2n\pi}{L}y\right)}{\sinh\left(\frac{2n\pi}{L}H^*\right)} \cos\left(\frac{2n\pi}{L}x\right), \quad \text{Eq. 2}$$

$$-\frac{L}{2} < x < \frac{L}{2}, 0 < y < H^*, \text{ and}$$

$$a_0 = \frac{1}{H^*}\left(\frac{1}{L}\int_{-\frac{L}{2}}^{\frac{L}{2}} g(x)dx - c_0\right),$$

$$a_n = \frac{2}{L}\int_{-\frac{L}{2}}^{\frac{L}{2}} (g(x) - c_0)\cos\left(\frac{2n\pi}{L}x\right)dx, n \geq 1,$$

where $g(x)=c(x,y=H^*)$. In the solid domain where $H^*<y<H^{**}$, since $c_w \approx c_i$, one neglect the influence of $c_w>c_i$ on the concentration field above the solid-liquid boundary. The boundary conditions on the tilted walls then effectively become homogeneous as shown in Equation 3:

$$c\left(x = \pm(\zeta - y)\tan\frac{\alpha}{2}, y\right) = c_i, H^* < y < \xi. \quad \text{Eq. 3}$$

It is noted that Equation 3 is only effectively true to estimate c(x,y) in the solid domain. In the liquid domain, the concentration field mostly sees the effect of $c_w$ rather than $c_i$, so the right hand side should then be substituted by $c_w$. As the limit of $\alpha \rightarrow 0$, one can approximate the triangular domain as a sector shape. The problem then changes to:

$$\Delta c(r, \varphi) = 0, r \approx \xi - y, \varphi \approx \frac{x}{\xi - y}, \quad \text{Eq. 4}$$

$$c(r = H, \varphi) = g(H\varphi), c\left(r, \varphi = \frac{\alpha}{2}\right) = v\left(r, \varphi = -\frac{\alpha}{2}\right) = c_i.$$

The general solution to this problem is:

$$c(r, \varphi) = c_i + \Sigma_{m \geq 0} b_m \cos\left(\frac{2m+1}{\alpha}\pi\varphi\right)\left(\frac{r}{H}\right)^{\frac{2m+1}{\alpha}\pi}, \quad \text{Eq. 5}$$

$$H^* < y < H^{**}$$

$$b_m = \frac{2}{\alpha}\int_{-\frac{\alpha}{2}}^{\frac{\alpha}{2}} (g(H\varphi) - c_i) \cos\left(\frac{2m+1}{\alpha}\pi\varphi\right)d\varphi \approx$$

$$\frac{2}{L}\int_{-\frac{L}{2}}^{\frac{L}{2}} (g(x) - c_i) \cos\left(\frac{2m+1}{L}\pi x\right)dx, m \geq 1$$

Combining Equations 2 and 5, using the continuity of $$\frac{\partial c}{\partial y} \text{ at } y = H^*,$$

leads to:

$$a_0 + \sum_{n \geq 1} \frac{2n\pi}{L} a_n \cos\left(\frac{2n\pi}{L}x\right) = \sum_{m \geq 0} -\frac{2m+1}{H\alpha}\pi b_m \cos\left(\frac{(2m+1)}{\alpha}\pi\varphi\right) \approx \quad \text{Eq. 6}$$

$$\sum_{m \geq 0} -\frac{2m+1}{L}\pi b_m \cos\left(\frac{(2m+1)}{L}\pi x\right)$$

Rearranging Equation 6 results in:

$$a_0 + \sum_{n \geq 1} \frac{2n\pi}{L} a_n \cos\left(\frac{2n\pi}{L}x\right) + \sum_{m \geq 0} \frac{2m+1}{L}\pi b_m \cos\left(\frac{(2m+1)}{L}\pi x\right) = 0 \quad \text{Eq. 7}$$

By multiplying both sides of Equation 7 by $$\cos\left(\frac{2n\pi}{L}x\right) \text{ or } \cos\left(\frac{(2m+1)}{L}\pi x\right),$$

and integrating both sides from $$-\frac{L}{2} \text{ to } \frac{L}{2},$$

one obtains:

$$0 = \begin{cases} n\pi a_n, n \geq 1 \\ \frac{(-1)^m 2L}{(2m+1)\pi} a_0 + \frac{(2m+1)\pi}{2} b_m, m \geq 0 \end{cases} \quad \text{Eq. 8}$$

Therefore, all the coefficients of $a_n$ ($n \geq 1$) should be 0. Equation 2 becomes:

$$c(x, y) = c_0 + a_0 y, -\frac{L}{2} < x < \frac{L}{2}, 0 < y < H^*. \quad \text{Eq. 9}$$

If $y=H^*$, then it follows that:

$c(x,H^*)=c_0+a_0H^*=\text{const}\equiv c_b$

Combining Equations 8 and 10 yields:

$$b_m = \frac{(-1)^{m+1} 4}{(2m+1)^2 \pi^2} La_0 = \frac{(-1)^m 4}{(2m+1)^2 \pi^2} \frac{L}{H^*}(c_0 - c_b) \quad \text{Eq. 11}$$

It is noted that $|b_m| \propto (2m+1)^{-2}$. Therefore Equation 5 can be well approximated by keeping the first term (m=0):

$$c(r, \varphi) \approx c_i - G\frac{L}{H} * (c_0 - c_b)\cos\left(\frac{(2m+1)}{L}\pi\varphi\right)\left(\frac{r}{H}\right)^{\frac{(2m+1)}{\alpha}\pi} \quad \text{Eq. 12}$$

$$c(x, y) \approx c_i + G\frac{L}{H} * (c_0 - c_b)\cos\left(\frac{(2m+1)}{L}\pi x\right)\left(\frac{\xi - y}{H}\right)^{\frac{\pi}{2\tan\frac{\alpha}{2}}},$$

where G is a constant. In the testing described herein, H*=H. Therefore, by letting $c(x=0, y=H^*)=c_b$, Equation 12 implies:

$$\frac{c_b - c_i}{c_0 - c_b} \propto \frac{L}{H} \propto \tan\frac{\alpha}{2}. \quad \text{Eq. 13}$$

Letting x=0, Equation 12 can also be rearranged as follows:

$$\frac{c(x=0, y) - c_i}{c_0 - c_b} \approx G\frac{L}{H^*}\left(\frac{\xi - y}{H}\right)^{\frac{\pi}{2\tan\frac{\alpha}{2}}}. \quad \text{Eq. 14}$$

Invoking Equation 13 and the condition of H*=H, one obtains:

$$\frac{c(x=0, y) - c_i}{c_0 - c_b} \approx G\frac{L}{H}\left(\frac{\xi - y}{H}\right)^{\frac{\pi}{2\tan\frac{\alpha}{2}}} \propto \frac{c_b - c_i}{c_0 - c_b}\left(\frac{\xi - y}{H}\right)^{\frac{\pi}{2\tan\frac{\alpha}{2}}} \quad \text{Eq. 15}$$

Therefore, it follows that:

$$\frac{c(x=0, y) - c_i}{c_b - c_i} \propto \left(\frac{\xi - y}{H}\right)^{\frac{\pi}{2\tan\frac{\alpha}{2}}} \quad \text{Eq. 16}$$

To ensure the flux in the liquid regime is negative, i.e. evaporation, $c(x=0, y=H^{})$ is chosen to be $c_w$. Solving for H by equating $c(x=0, y=H^{})$ to $c_w$, and defining the frost coverage $f=(H^{}-H^*)/H$ yields:

$$\ln(1-f) = \frac{2}{\pi}\tan\frac{\alpha}{2}\ln\left(\frac{c_w - c_i}{c_b - c_i}\right) - \ln(G) \quad \text{Eq. 17}$$

Thus, described herein are characteristics of the condensation frosting process on hydrophobic and other surfaces with millimetric serrated features inspired by the veins of natural leaves. The results show that frosting always initiates from the peak and undergoes a four-stage process including condensation, fast propagation, evaporation, and out-of-plane growth. A discontinuous frost pattern (i.e., a non-frosted area centered at the valley) forms and is found to be able to resist further frosting for a long period of time. The spatial span of the non-frosted area is found to expand when the vertex angle of the serrated feature decreases, and when the ambient relative humidity decreases. The 3D growth of the frost cover by deposition is found to be much faster on the peak compared to valley. As the vertex angle decreases, the frost grows slower at the peak. By simulating the mass transport of water vapor near the serrated features, the distribution of droplet size and number density of drops is explained by the greater magnitude of diffusion flux near the peak than in the valley.

It has also been shown that condensation plays a key role in the formation of the discontinuous frost pattern by comparing the distribution of diffusion flux magnitude and the corresponding frost patterns for the surfaces with various vertex angles and ambient humidity. It is found that the frost front for all surface geometries and humidity shares a similar magnitude of diffusion flux, suggesting the frost pattern affected by the millimetric topography originates from the diffusional behavior of water vapor. The heat transfer in the frost cover is also simulated, and the magnitude of heat flux is found to be much smaller at the peak due to the low thermal conductivity and large thickness of the frost cover. This explains the slower accretion rate of frost at the peaks for smaller vertex angles, and indicates the important role of heat transfer in the out-of-plane growth of frost.

The macroscopic surface topography effects described herein can be applied to realize spatial control of frost in a wide spectrum of applications such as aviation, wind power generation, infrastructure of buildings, antennas, wires, powerlines, etc. For example, surfaces formed in accordance with the techniques described herein can be used to form aircraft propellers and rotors, aircraft fuselages, wire casings, water pipes or pipe casings to help prevent freeze up, siding for buildings, walkways, windows, vehicle bodies, wind turbine blades and components, antennas and antenna housings, cellular tower components, cases for electronic devices that are used in cold climates (e.g., earthquake sensors, outdoor cameras, outdoor lights), etc.

In an illustrative embodiment, the proposed surfaces include one or more ridges (or waves) that result in peak(s) and valley(s) to control and minimize frost buildup. In an illustrative embodiment, the ridges have sharp peaks (e.g., as shown in FIG. 2B). Alternatively, the ridges may be in the form of waves that have curved peaks. The one or more ridges each have a vertex angle α (see FIG. 2B) and a vertex height, each of which can be used to control frost formation as described herein. In an illustrative embodiment, the vertex angle can be between 40° and 100°. In alternative embodiments, different vertex angles can be used, such as 20°, 30°, 110°, 120°, 140°, etc. In another illustrative embodiment, the vertex height can be between 1 mm and 5 mm. Alternatively, other vertex heights may be used such as 0.5 mm, 6 mm, 8 mm, 10 mm, etc. In some embodiments, the surface can include a plurality of ridges, where different ridges have different vertex angles and/or vertex heights. As a result, different portions of the surface can be controlled to form frost at different rates and/or in different patterns.

The ridges depicted herein are straight ridges that run in a straight line from one edge of the surface to another edge of the surface (see, e.g., FIG. 2B). In alternative embodiments, the ridges can be curved relative to the main plane of the surface. For example, the ridges may form a S-pattern or other pattern depending on the overall shape of the surface, the desired appearance of the surface, etc. Additionally, the ridges may only appear on a portion of the surface, and do not have to extend from edge to edge of the surface as depicted herein. Rather, the surface can include one or more areas that include ridges and one or more areas that do not include ridges.

In some embodiments, the surface can be hydrophilic or superhydrophilic. Alternatively, the surface can be hydrophobic or superhydrophobic. The surface can be hydrophobic based on its natural characteristics, or by way of a treatment, coating, or other process applied to the substrate used to form the surface. Any type of hydrophobic surface coating or treatment process may be used.

The surfaces described herein can be formed using any manufacturing technique(s) known in the art. In one embodiment, as described above, one or more plastic molds can be formed by 3D printing or through another technique.

The one or more plastic molds can include the desired number and shape of ridges. A source material (or substrate) for the surface is placed on or between the one or more plastic molds, and pressure is applied such that the source material conforms to the ridges in the mold(s). The substrate can be metal, another plastic, silicon, etc. Alternatively, a different process can be used to form the surface such as bending the substrate to form the surface, melting (or heating) the substrate so that a standard mold can be used, appending ridges to a flat substrate via adhesive, weld, or solder, direct 3D printing, etc.

In an illustrative embodiment, any of the apparatuses or systems described herein can include and/or be in communication with a computing system that includes, a memory, processor, user interface, transceiver, and any other computing components. Any of the operations described herein may be performed by the computing system. The operations can be stored as computer-readable instructions on a computer-readable medium such as the computer memory. Upon execution by the processor, the computer-readable instructions are executed as described herein.

Figure 18:
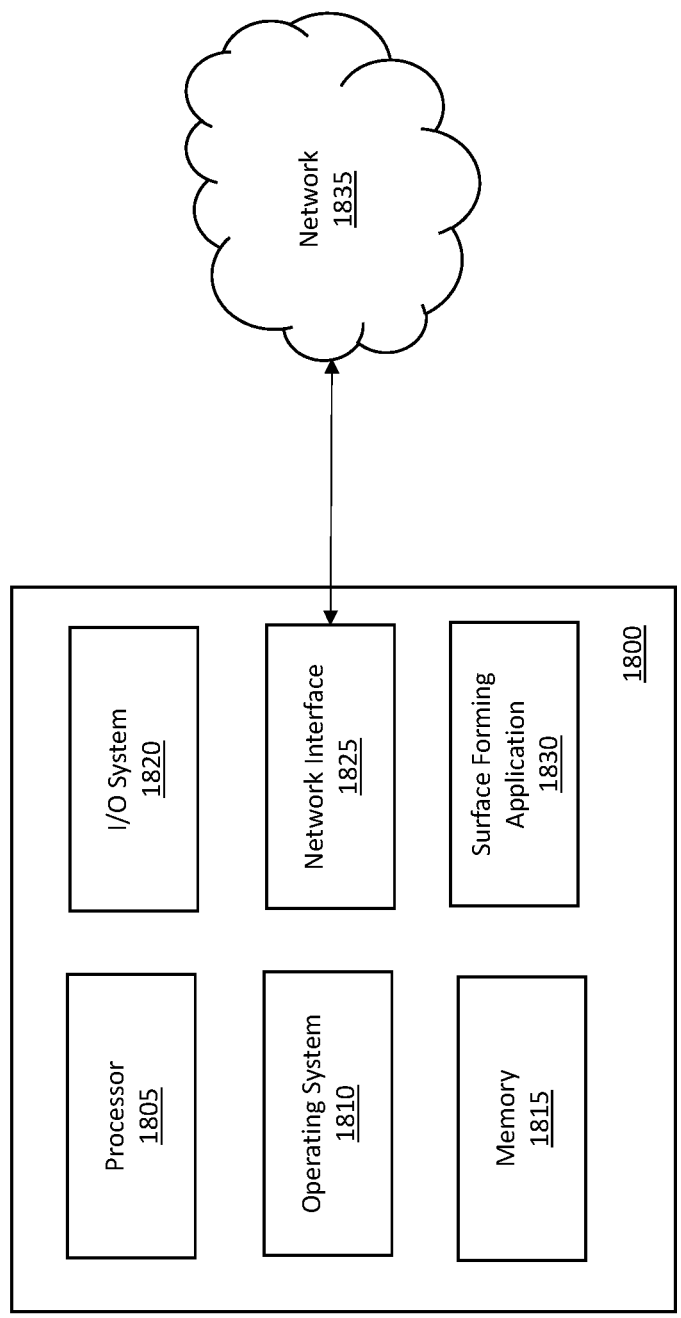
FIG. 18 is a block diagram of a computing device in communication with a network in accordance with an illustrative embodiment.

As an example, FIG. 18 is a block diagram of a computing device 1800 in communication with a network 1835 in accordance with an illustrative embodiment. The computing device 1800 can be part of an icephobic surface forming and testing system in an illustrative embodiment. The computing device 1800 includes a processor 1805, an operating system 1810, a memory 1815, an input/output (I/O) system 1820, a network interface 1825, and a surface forming application 1830. In alternative embodiments, the computing device 1800 may include fewer, additional, and/or different components. The components of the computing device 1800 communicate with one another via one or more buses or any other interconnect system. The computing device 1800 can be any type of networked computing device such as a laptop computer, desktop computer, smart phone, tablet, gaming device, workstation, server, a music player device, etc.

The processor 1805 can be used to determine parameters for an ice resistant surface, such as vertex angle, vertex height, ridge pattern, number of ridges, placement/positioning of ridges, etc. In one embodiment, the processor 1805 can determine surface parameters based on one or more desired frost formation patterns. The desired frost formation patterns can differ based on the application of the surface being formed, the conditions in which the surface will be subjected, the material from which the substrate that forms the surface is made, the coating/treatment on the substrate, etc.

The processor 1805 can be any type of computer processor known in the art, and can include a plurality of processors and/or a plurality of processing cores. The processor 1805 can include a controller, a microcontroller, an audio processor, a graphics processing unit, a hardware accelerator, a digital signal processor, etc. Additionally, the processor 1805 may be implemented as a complex instruction set computer processor, a reduced instruction set computer processor, an x86 instruction set computer processor, etc. The processor 1805 is used to run the operating system 1810, which can be any type of operating system.

The operating system 1810 is stored in the memory 1815, which is also used to store programs, user data, network and communications data, peripheral component data, the surface forming application 1830, and other operating instructions. The memory 1815 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 1820 is the framework which enables users and peripheral devices to interact with the computing device 1800. The I/O system 1820 can include a mouse, a keyboard, one or more displays, a speaker, a microphone, etc. that allow the user to interact with and control the computing device 1800. The I/O system 1820 also includes circuitry and a bus structure to interface with peripheral computing devices such as power sources, USB devices, data acquisition cards, peripheral component interconnect express (PCIe) devices, serial advanced technology attachment (SATA) devices, high definition multimedia interface (HDMI) devices, proprietary connection devices, etc.

The network interface 1825 includes transceiver circuitry that allows the computing device 1800 to transmit and receive data to/from other devices such as remote computing systems, servers, websites, etc. The network interface 1825 enables communication through a network 1835, which can be one or more communication networks. The network 1835 can include a cable network, a fiber network, a cellular network, a wi-fi network, a landline telephone network, a microwave network, a satellite network, etc. The network interface 1825 also includes circuitry to allow device-to-device communication such as Bluetooth® communication.

The surface forming application 1830 can include software in the form of computer-readable instructions which, upon execution by the processor 1805, performs any of the various operations described herein for determining and analyzing surface characteristics, dimensions, shapes, etc. The surface forming application 1830 can utilize the processor 1805 and/or the memory 1815 as discussed above. In an alternative implementation, the surface forming application 1830 can be remote or independent from the computing device 1800, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of forming an ice resistant surface comprising:
    determining, based at least in part on a desired pattern of frost formation and a desired distribution of diffusion flux magnitude, a vertex angle for a ridge that is to be formed on a substrate;
    determining, based at least in part on the desired pattern of frost formation, a vertex height for the ridge that is to be formed on the substrate; and forming a plurality of ridges on the substrate, wherein each ridge in the plurality of ridges has the vertex angle and the vertex height.

2. The method of claim 1, further comprising coating the substrate with a hydrophobic material such that the substrate has a hydrophobic surface on which the plurality of ridges are formed.

3. The method of claim 1, wherein the plurality of ridges form a serrated pattern.

4. The method of claim 1, wherein determining the vertex angle is based at least in part on an expected humidity level in which the substrate is to be used.

5. The method of claim 1, wherein determining the vertex angle is based at least in part on a desired rate of out-of-plane growth of frost on the substrate.

6. The method of claim 1, further comprising forming the substrate into a desired shape, wherein the substrate comprises at least one of aluminum or plastic.

7. The method of claim 1, wherein forming the plurality of ridges comprises forming a plurality of peaks and valleys on the substrate.

8. The method of claim 7, wherein the plurality of peaks and valleys are formed such that frost accumulates more on the peaks than the valleys.

9. The method of claim 1, wherein forming the plurality of ridges comprises forming a pair of molds that include the plurality of ridges.

10. The method of claim 9, wherein forming the plurality of ridges further comprises pressing the substrate between the pair of molds to form the plurality of ridges in the substrate.

11. The method of claim 1, wherein the plurality of ridges comprises a first plurality of ridges, the vertex angle comprises a first vertex angle, and the desired pattern of frost formation comprises a first desired pattern of frost formation, and further comprising forming a second plurality of ridges on the substrate, wherein the second plurality of ridges have a second vertex angle.

12. The method of claim 11, further comprising determining the second vertex angle based on a second desired pattern of frost formation.

13. The method of claim 12, wherein the first plurality of ridges are formed on a first portion of the substrate which is to have the first desired pattern of frost formation, and the second plurality of ridges are formed on a second portion of the substrate which is to have the second desired pattern of frost formation.

14. The method of claim 1, wherein the plurality of ridges comprises a first plurality of ridges and the vertex height comprises a first vertex height, and further comprising forming a second plurality of ridges on the substrate, wherein the second plurality of ridges have a second vertex height.

15. A system for forming an ice resistant surface comprising:
   a memory configured to store information regarding relationships between vertex angles and frost formation patterns;
   a processor operatively coupled to the memory and configured to:
   determine, based at least in part on a desired pattern of frost formation and a desired distribution of diffusion flux magnitude, a vertex angle for a ridge that is to be formed on a substrate; and
   determine, based at least in part on the desired pattern of frost formation, a vertex height for the ridge that is to be formed on the substrate; and
   a mold that includes a plurality of ridges and that is configured to form the plurality of ridges on the substrate, wherein each ridge in the plurality of ridges has the vertex angle and the vertex height.

16. The system of claim 15, further comprising a hydrophobic coating on the substrate such that the substrate has a hydrophobic surface on which the plurality of ridges are formed.

17. The system of claim 15, wherein the mold comprises a pair of surfaces that include the plurality of ridges and that are configured to receive the substrate in between the pair of surfaces.

18. The system of claim 15, wherein the processor determines the vertex angle based at least in part on a desired rate of out-of-plane growth of frost on the substrate.

19. The system of claim 15, wherein the processor determines the vertex angle based at least in part on an expected humidity level in which the substrate is to be used.

20. The system of claim 15, wherein the plurality of ridges comprises a first plurality of ridges, the vertex angle comprises a first vertex angle, and the desired pattern of frost formation comprises a first desired pattern of frost formation, and wherein the processor is further configured to determine, based at least in part on a second desired pattern of frost, a second vertex angle for a second plurality of ridges that are to be formed on the substrate.

* * * * *